(12) United States Patent
Akishita et al.

(10) Patent No.: US 8,290,148 B2
(45) Date of Patent: Oct. 16, 2012

(54) ENCRYPTION PROCESSING APPARATUS, ENCRYPTION PROCESSING METHOD, AND COMPUTER PROGRAM

(75) Inventors: Toru Akishita, Tokyo (JP); Taizo Shirai, Kanagawa (JP); Kyoji Shibutani, Kanagawa (JP); Shiho Moriai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1206 days.

(21) Appl. No.: 11/846,853

(22) Filed: Aug. 29, 2007

(65) Prior Publication Data

US 2008/0056490 A1 Mar. 6, 2008

(30) Foreign Application Priority Data

Sep. 1, 2006 (JP) ................................ 2006-238224

(51) Int. Cl.
*G06F 21/00* (2006.01)
(52) U.S. Cl. .......................................... 380/29; 380/28
(58) Field of Classification Search .................. 380/28, 380/29
See application file for complete search history.

(56) References Cited

U.S. PATENT DOCUMENTS

| | | | | |
|---|---|---|---|---|
| 5,703,952 | A * | 12/1997 | Taylor | 380/44 |
| 7,421,067 | B2 * | 9/2008 | Dewing et al. | 379/88.12 |
| 7,421,076 | B2 * | 9/2008 | Stein et al. | 380/42 |
| 2001/0024502 | A1 | 9/2001 | Ohkuma et al. | |
| 2003/0133568 | A1 * | 7/2003 | Stein et al. | 380/37 |
| 2004/0184602 | A1 * | 9/2004 | Nadehara | 380/28 |
| 2005/0058285 | A1 * | 3/2005 | Stein et al. | 380/29 |
| 2007/0058805 | A1 | 3/2007 | Ohkuma et al. | |

FOREIGN PATENT DOCUMENTS

| | | |
|---|---|---|
| EP | 1 133 100 A2 | 9/2001 |
| JP | HEI 11 282346 | 10/1999 |
| JP | 2004 233427 | 8/2004 |

OTHER PUBLICATIONS

K. Nyberg, "Generalized Feistel Networks", ASIACRYPT'96. SpringerVerlag, 1996, pp. 91-104.
Y. Zheng et al,, 'On the Construction of Block Ciphers Provably Secure and Not Relying on Any Unproved Hypothesesm CRYPTO, 1989, pp. 461-480.
Office Action for Japanese Patent Application No. 2006-238224, drafting date Aug. 26, 2011.
Shimomura, T, et al., "Hardware implementation and the evaluation of encryption algorithm Rijndael", The Institute of Electronics, Information and Communication Engineers technology memoir, Corporate judicial person Institute of Electronics, Information and Communication Engineers, Jan. 21, 2003, vol. 102, No. 610, pp. 13-17, Abstract.

* cited by examiner

*Primary Examiner* — Michael Pyzocha
*Assistant Examiner* — Randal Moran
(74) *Attorney, Agent, or Firm* — Finnegan, Henderson, Farabow, Garrett & Dunner, L.L.P.

(57) ABSTRACT

An encryption processing apparatus for performing common-key blockcipher processing, the encryption processing apparatus includes an encryption processing part that performs data transformation in which a round function is iterated for a plurality of rounds; and a key scheduling part that generates round keys used to execute the round function. The key scheduling part is configured to repeatedly apply an $x^s$ times multiplication over an extension field $GF(2^m)$, generated by an m-th order irreducible polynomial $f(x)$ defined over $GF(2)$, to an m-bit intermediate key generated by transformation of a secret key to generate a plurality of different round intermediate keys serving as data for generating a plurality of different round keys.

14 Claims, 20 Drawing Sheets

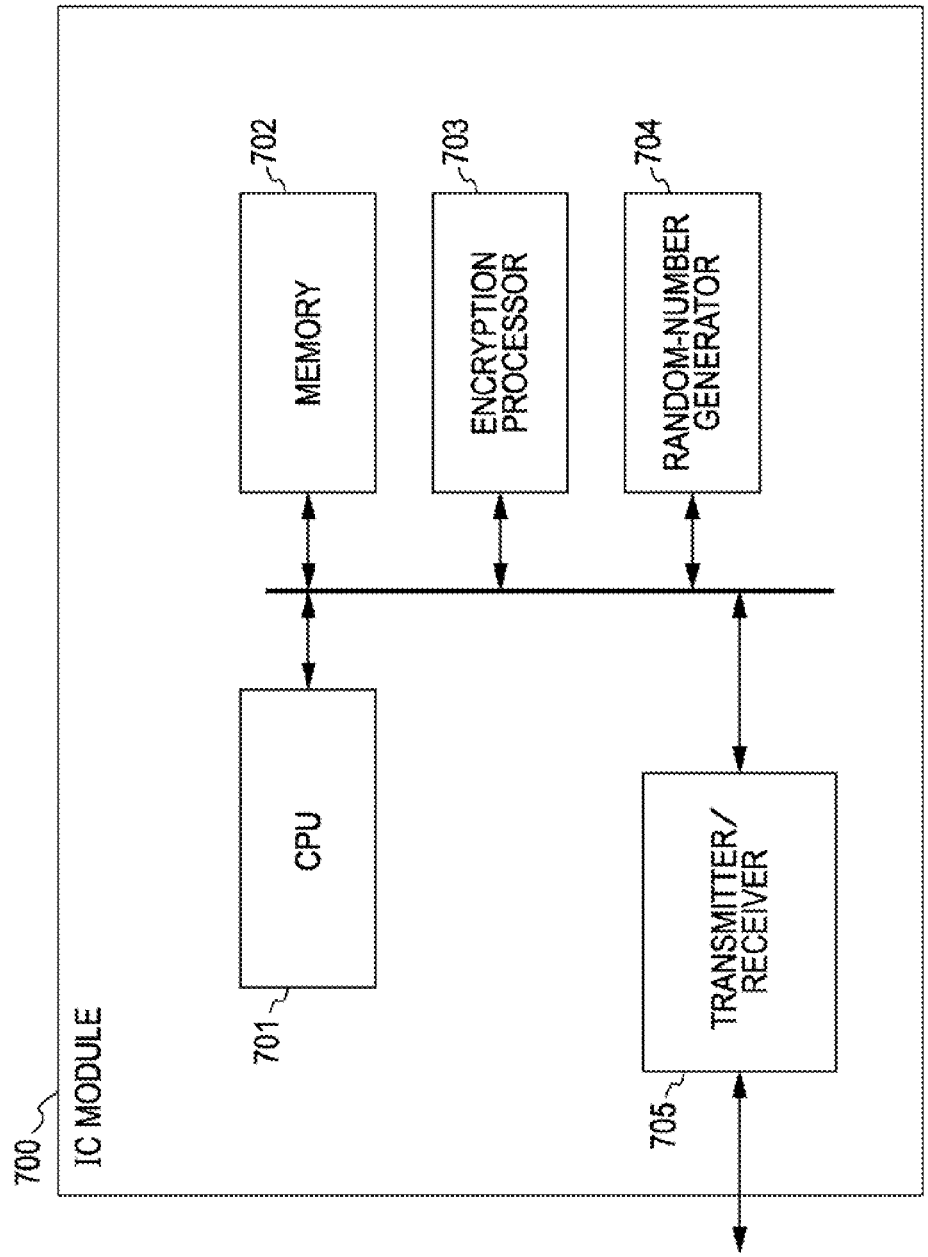

ENCRYPTION PROCESSING APPARATUS, ENCRYPTION PROCESSING METHOD, AND COMPUTER PROGRAM

CROSS REFERENCES TO RELATED APPLICATIONS

The present invention contains subject matter related to Japanese Patent Application JP 2006-238224 filed in the Japanese Patent Office on Sep. 1, 2006, the entire contents of which are incorporated herein by reference.

BACKGROUND OF THE INVENTION

1. Field of the Invention

The present invention relates to encryption processing apparatuses, encryption processing methods, and computer programs. More specifically, the present invention relates to an encryption processing apparatus, an encryption processing method, and a computer program for performing common-key blockcipher processing.

2. Description of the Related Art

With the recent development of network communication and electronic transactions, there has arisen a serious problem of maintenance of security in communication. Cryptography is one of methods used in the maintenance of security, and currently communication using various cryptographic techniques is actually performed.

For example, there have been put into practical use systems in which an encryption module is embedded in a compact device such as an integrated circuit (IC) card so that data is transmitted and received between the IC card and a reader/writer serving as a data read/write device to perform authentication or encryption and decryption of transmission and received data.

There are various cryptographic algorithms. The algorithms are roughly classified into public-key cryptography in which encryption and decryption keys are set as different keys, e.g., a public key and a secret key, and common-key cryptography in which a common key is used as both an encryption key and a decryption key.

There are various algorithms in common-key cryptography. In one of such algorithms, a plurality of keys are generated based on a common key and data transformation is repeated in units of blocks (64 bits, 128 bits, etc.) using the generated plurality of keys. A typical algorithm using such key generation and data transformation is common-key blockcipher cryptography.

Examples of common common-key blockcipher algorithms include the Data Encryption Standard (DES) algorithm, which was the U.S. encryption standard, and the Advanced Encryption Standard (AES) algorithm, which is now the U.S. standard.

Such a common-key blockcipher algorithm is mainly composed of an encryption processing part including round-function executing parts that repeatedly transform input data, and a key scheduling part generating a round key used for each of the rounds corresponding to the round-function executing parts. The key scheduling part first generates an expanded key with an increased number of bits on the basis of a master key (primary key), which is a secret key, and then generates a round key (sub-key) used for each of the round-function executing parts of the encryption processing part on the basis of the generated expanded key.

There is a specific structure of the related art for implementing the algorithm, in which a round function including a linear transformation part and a non-linear transformation part is iterated. One typical structure is a Feistel structure. The Feistel structure is a structure in which plaintext is transformed into ciphertext using simple iterated round functions (F-functions) serving as data transformation functions. In each of the round functions (F-functions), linear transformation and non-linear transformation are performed. Ciphers with the Feistel structure are disclosed in, for example, K. Nyberg, "Generalized Feistel networks", ASIACRYPT '96, Springer-Verlag, 1996, pp. 91-104; and Yuliang Zheng, Tsutomu Matsumoto, and Hideki Imai, "On the Construction of Block Ciphers Provably Secure and Not Relying on Any Unproved Hypotheses", CRYPTO 1989: 461-480.

One problem with common-key blockciphers is key leakage due to cryptanalysis. The problem of being easy to break keys by cryptanalysis leads to low cryptographic security, and is serious in practice.

SUMMARY OF THE INVENTION

It is therefore desirable to provide an encryption processing apparatus, an encryption processing method, and a computer program for achieving a high-security common-key blockcipher algorithm with greater difficulty of cryptanalysis.

According to a first embodiment of the present invention, there is provided an encryption processing apparatus for performing common-key blockcipher processing, the encryption processing apparatus including an encryption processing part that performs data transformation in which a round function is iterated for a plurality of rounds; and a key scheduling part that generates round keys used to execute the round function, wherein the key scheduling part repeatedly applies an $x^s$ times multiplication over an extension field $GF(2^m)$, generated by an m-th order irreducible polynomial $f(x)$ defined over $GF(2)$, to an m-bit intermediate key generated by transformation of a secret key, and generates a plurality of different round intermediate keys serving as data for generating a plurality of different round keys.

In the encryption processing apparatus, the key scheduling part may be configured to repeatedly apply an $x^s$ times multiplication over an extension field $GF(2^m)$, generated by an m-th order irreducible polynomial $f(x)$ defined over $GF(2)$, to an m-bit intermediate key MK generated by transformation of the secret key to generate q round intermediate keys $\{MK_1, MK_2, \ldots, MK_{q-1}, MK_q\}$ according to the following expressions:

$$MK_1 = MK$$

$$MK_2 = MKx^s$$

$$MK_3 = MKx^{2\times s}$$

$$\ldots$$

$$MK_{q-1} = MKx^{(q-2)\times s}$$

$$MK_q = MKx^{(q-1)\times s}$$

In the encryption processing apparatus, when the number of round intermediate keys to be generated is q, the key scheduling part may be configured to repeat the $x^s$ times multiplication to generate q different round intermediate keys, and may be configured to then apply an $x^{-(q-1)\times s}$ times multiplication to round-intermediate-key data generated by the (q−1)-th last $x^s$ times multiplication, given by $MK_q = MKx^{(q-1)\times s}$, to return to an original intermediate key MK that has not been subjected to the $x^s$ times multiplication.

In the encryption processing apparatus, the key scheduling part may perform bit selection of constituent data of the round intermediate keys generated by repeating the $x^s$ times multiplication to generate round keys used to execute the round function in the encryption processing part.

In the encryption processing apparatus, the key scheduling part may be configured to perform bit selection of constituent data of the round intermediate keys generated by repeating the $x^s$ times multiplication to generate keys including round keys used to execute the round function in the encryption processing part, an initial key used for initial data transformation before the round function is executed, and a final key used for final data transformation after the round function is executed.

In the encryption processing apparatus, the key scheduling part may be configured to perform bit selection of constituent data of the round intermediate keys generated by repeating the $x^s$ times multiplication, and may be configured to further perform an exclusive-OR operation between the bit-selected data and constants different for the round keys to be provided for the encryption processing part to generate round keys.

In the encryption processing apparatus, the key scheduling part may be configured to perform non-linear transformation on constituent data of the secret key to generate the intermediate key by transformation of the secret key.

According to a second embodiment of the present invention, there is provided an encryption processing method for common-key blockcipher processing in an encryption processing apparatus, the encryption processing method including the steps of in a key scheduling part, generating a plurality of round keys used to execute round functions for a plurality of rounds in an encryption processing part; and in the encryption processing part, performing data transformation in which the round functions are repeated in the plurality of rounds using the round keys, wherein the step of generating a plurality of round keys includes repeatedly applying an $x^s$ times multiplication over an extension field $GF(2^m)$, generated by an m-th order irreducible polynomial f(x) defined over GF(2), to an m-bit intermediate key generated by transformation of a secret key to generate a plurality of different round intermediate keys serving as data for generating a plurality of different round keys, and performing bit selection from the round intermediate keys to generate the round keys.

In the encryption processing method, the step of generating a plurality of round keys may include repeatedly applying an $x^s$ times multiplication over an extension field $GF(2^m)$, generated by an m-th order irreducible polynomial f(x) defined over GF(2), to m-bit intermediate key MK generated by transformation of the secret key to generate q round intermediate keys $\{MK_1, MK_2, \ldots, MK_{q-1}, MK_q\}$ according to the following expressions:

$MK_1 = MK$ $MK_2 = MKx^s$ $MK_3 = MKx^{2 \times s}$

...

$MK_{q-1} = MKx^{(q-2) \times s}$ $MK_q = MKx^{(q-1) \times s}$

In the encryption processing method, in the key scheduling part, the step of generating a plurality of round keys may further include repeating the $x^s$ times multiplication to generate q different round intermediate keys, and then applying an $x^{-(q-1) \times s}$ times multiplication to round-intermediate-key data generated by the (q-1)-th last $x^s$ times multiplication, given by $MK_q = MKx^{(q-1) \times s}$, to return to an original intermediate key MK that has not been subjected to the $x^s$ times multiplication.

In the encryption processing method, the step of generating a plurality of round keys may include performing bit selection of constituent data of the round intermediate keys generated by repeating the $x^s$ times multiplication to generate keys including round keys used to execute the round functions in the encryption processing part, an initial key used for initial data transformation before the round functions are executed, and a final key used for final data transformation after the round functions are executed.

In the encryption processing method, the step of generating a plurality of round keys may include performing an exclusive-OR operation between bit-selected data extracted in the performing bit selection and constants different for the round keys to be provided for the encryption processing part to generate round keys.

In the encryption processing method, in the step of generating a plurality of round keys, the transformation of a secret key may be performed by performing non-linear transformation on constituent data of the secret key.

According to a third embodiment of the present invention, there is provided a computer program for allowing an encryption processing apparatus to perform common-key blockcipher processing, the program including the steps of in a key scheduling part, generating a plurality of round keys used to execute round functions for a plurality of rounds in an encryption processing part; and in the encryption processing part, performing data transformation in which the round functions are repeated in the plurality of rounds using the round keys, wherein the step of generating a plurality of round keys includes repeatedly applying an $x^s$ times multiplication over an extension field $GF(2^m)$, generated by an m-th order irreducible polynomial f(x) defined over GF(2), to an m-bit intermediate key generated by transformation of a secret key to generate a plurality of different round intermediate keys serving as data for generating a plurality of different round keys, and performing bit selection from the round intermediate keys to generate the round keys.

The computer program according to the embodiment of the present invention is a computer program that can be provided for a computer system capable of executing various types of program code in the form of a computer-readable storage medium or communication medium, e.g., a recording medium such as a compact disc (CD), a flexible disc (FD), or a magneto-optical (MO) disc, or a communication medium such as a network. The program is provided in computer-readable form, thereby implementing processing in accordance with the program on the computer system.

Further advantages will become apparent from the following detailed description of exemplary embodiments of the present invention taken in conjunction with the accompanying drawings. The term system as used herein refers to a logical set of apparatuses regardless of whether or not the apparatuses are housed in a single housing.

According to an embodiment of the present invention, in a key scheduling part for generating a round key in an encryption processing apparatus that performs common-key blockcipher processing, an $x^s$ times multiplication over an extension field $GF(2^m)$, generated by an m-th order irreducible polynomial f(x) defined over GF(2), is repeatedly applied to an m-bit intermediate key MK generated from a secret key, and a plurality of different round intermediate keys are generated. Based on the round intermediate keys, a plurality of different round keys are generated. According to another embodiment of the present invention, further, data selected from the round intermediate keys is exclusive-ORed using a constant different for each round to generate a round key. With this structure, a high-security encryption algorithm with greater difficulty of key analysis can be achieved.

BRIEF DESCRIPTION OF THE DRAWINGS

FIG. 20 is a diagram showing an example of the structure of an IC module as an implementation of an encryption processing apparatus configured to perform encryption according to an embodiment of the present invention.

DESCRIPTION OF THE PREFERRED EMBODIMENTS

An encryption processing apparatus, an encryption processing method, and a computer program according to embodiments of the present invention will be described in detail in accordance with the following items.

1. Overview of Common-Key Blockcipher
2. Encryption Structure including Generation of Intermediate-Key Data based on x Times Multiplication in Key Scheduling Part
(2-1) Detailed Structure of Key Scheduling Part
(2-2) Typical Generation of Intermediate-Key Data
(2-3) Generation of Intermediate-Key Data and Round Keys according to First Embodiment of the Present Invention.
(2-4) Generation of Intermediate-Key Data and Round Keys according to Second Embodiment of the Present Invention
3. Example Structure of Encryption Processing Apparatus 1. Overview of Common-Key Blockcipher First, the overview of a common-key blockcipher according to an embodiment of the present invention will be described. The term common-key blockcipher (hereinafter referred to as a "blockcipher") as used herein refers to a cipher defined as follows.

The blockcipher is constructed using plaintext P and a key K as input and ciphertext C as output. The bit length of plaintext and ciphertext is referred to as a block size, and is represented by n, where n can be any integer value and is typically a value determined in advance for each blockcipher algorithm. In the following description, a blockcipher with the block length n may be referred to as an "n-bit blockcipher".

The bit length of a key is represented by k. The key can have any integer value. A common-key blockcipher algorithm supports one or a plurality of key sizes. For example, a blockcipher algorithm A with a block size n of 128 bits may support various key sizes of bit length k=128, 192, or 256.

The bit sizes of the plaintext P, the ciphertext C, and the key K are as follows.

Plaintext P: n bits
Ciphertext C: n bits
Key K: k bits

Figure 1:
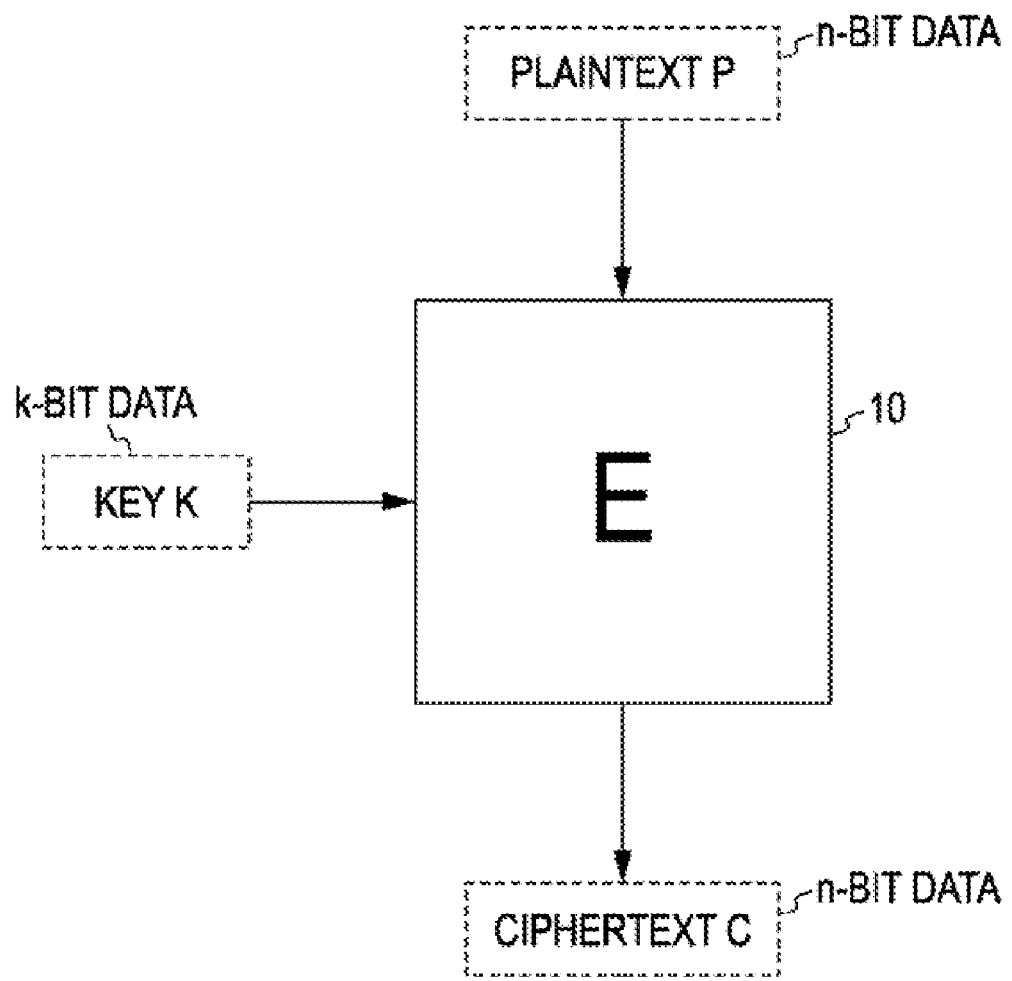
FIG. 1 is a diagram showing a basic configuration of a common-key blockcipher algorithm.

FIG. 1 shows an n-bit common-key blockcipher algorithm E that supports a key length of k bits. As shown in FIG. 1, n-bit plaintext P and a k-bit key K are input to a common-key blockcipher processing part E 10, and the common-key blockcipher processing part E 10 performs a predetermined encryption algorithm and outputs n-bit ciphertext C. In FIG. 1, only an encryption process for generating ciphertext from plaintext is illustrated. A decryption process for generating plaintext from ciphertext is generally performed using an inverse function to that used by the common-key blockcipher processing part E 10. However, the common-key blockcipher processing part E 10 may be configured such that the common-key blockcipher processing part E 10 can also be used in the decryption process. In this case, the decryption process can be performed by changing a sequence such as a key input order.

Figure 2:
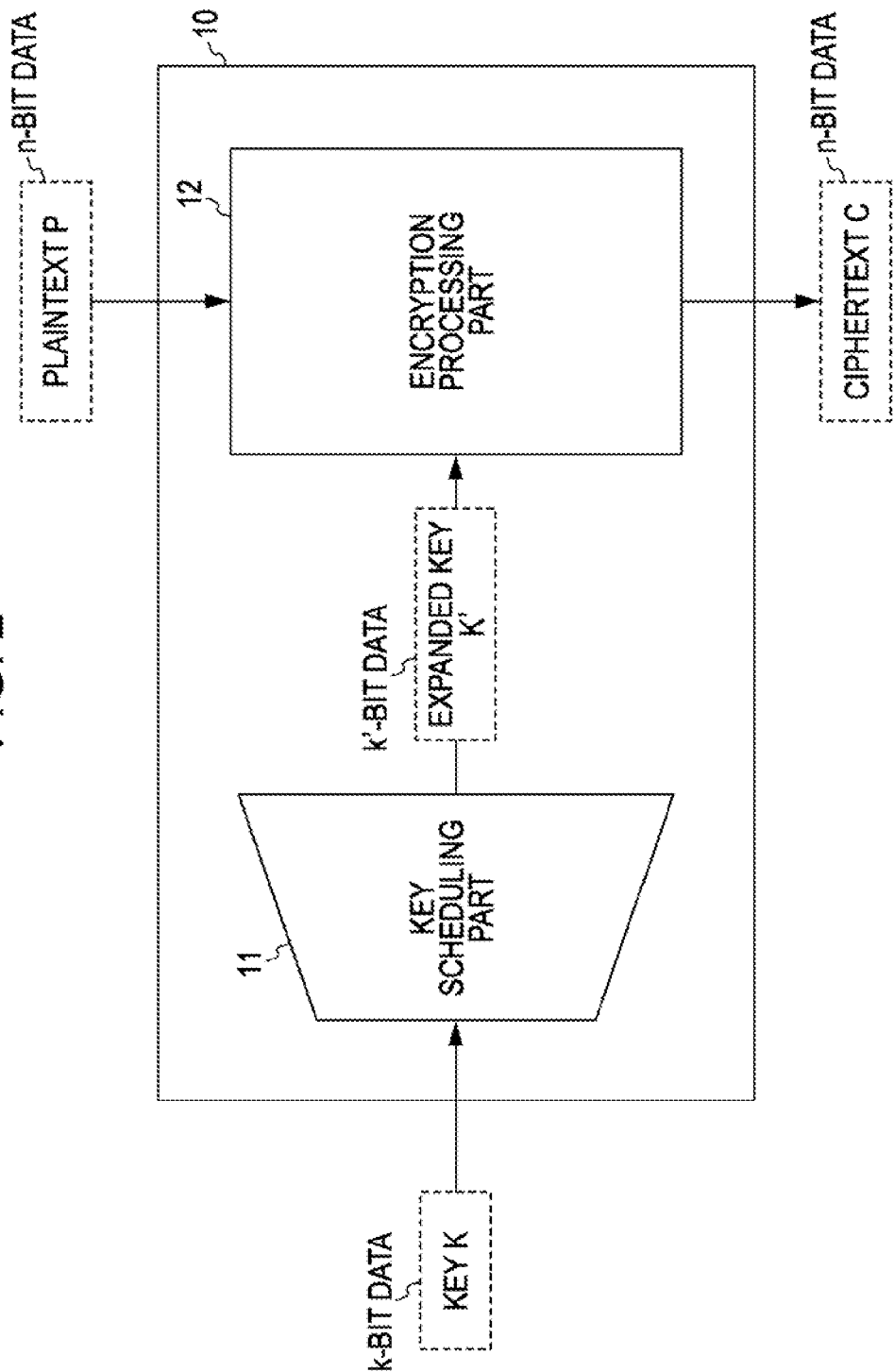
FIG. 2 is a diagram showing an internal structure of a common-key blockcipher processing part E 10 shown in FIG. 1.

The internal structure of the common-key blockcipher processing part E 10 shown in FIG. 1 will be described with reference to FIG. 2. The common-key blockcipher processing part E 10 includes two parts: a key scheduling part 11 and an encryption processing part 12. The key K is input to the key scheduling part 11, and the key scheduling part 11 increases the bit length of the input key K in a predetermined step and outputs an expanded key K' (with a bit length k'). The encryption processing part 12 receives the plaintext P and the expanded key K' input from the key scheduling part 11, and encrypts the plaintext P using the expanded key K' to perform data transformation for generating the ciphertext C. As described above, the encryption processing part 12 may be configured such that the encryption processing part 12 can also be used in the data decryption process for recovering plaintext from ciphertext.

Figure 3:
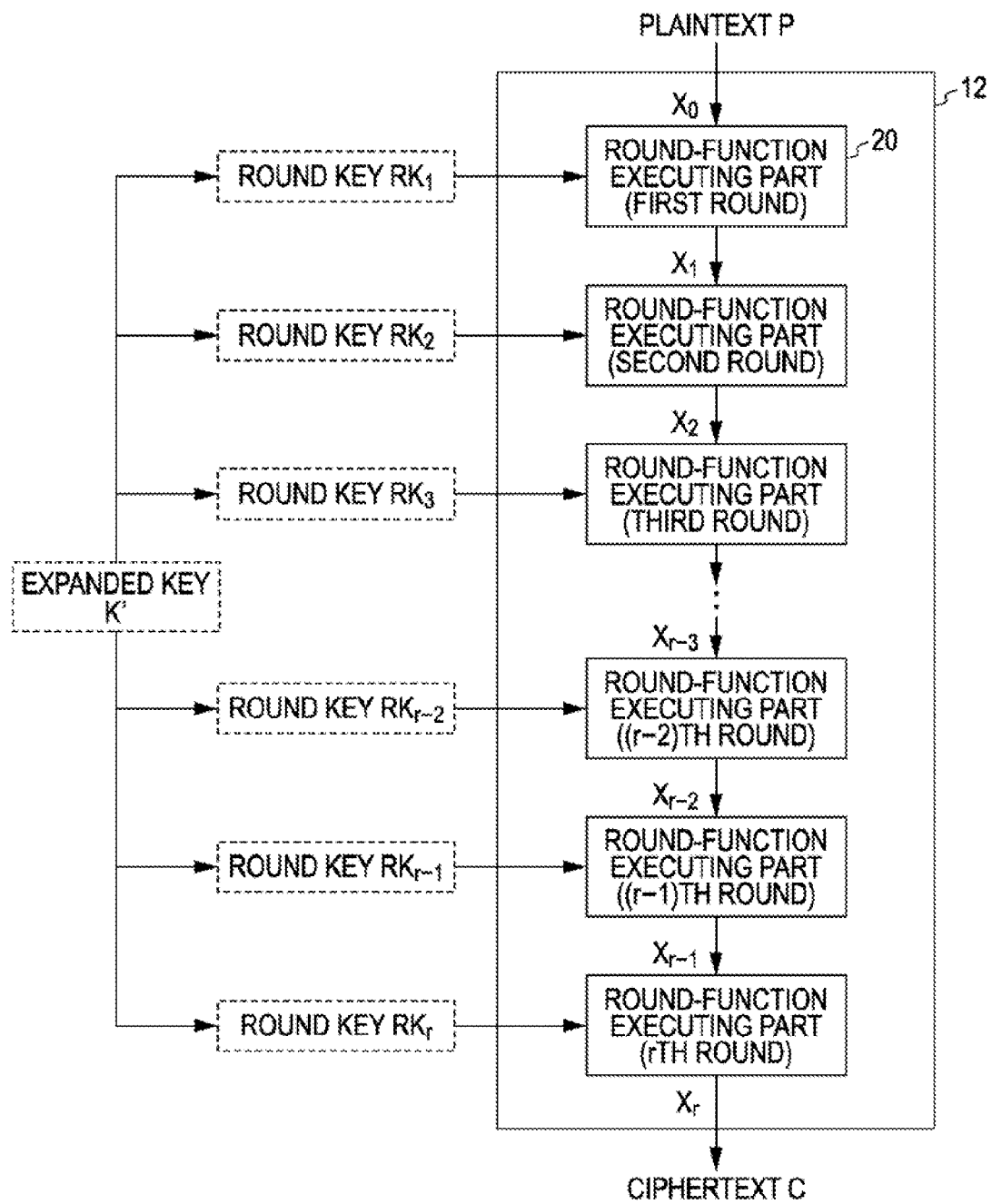
FIG. 3 is a diagram showing in detail the structure of an encryption processing part 12 shown in FIG. 2.

The detailed structure of the encryption processing part 12 shown in FIG. 2 will be described with reference to FIG. 3. As shown in FIG. 3, the encryption processing part 12 is configured to repeat data transformation using round-function executing parts 20. That is, the encryption processing part 12 can be divided into the round-function executing parts 20 as processing units. Each of the round-function executing parts 20 receives two types of data as input, i.e., an output $X_i$ of the previous round-function executing part and a round key $RK_i$ generated on the basis of the expanded key K', and performs data transformation to output data $X_{i+1}$ to the next round-function executing part. In the first round, plaintext or initialization data corresponding to plaintext is input. In the final round, ciphertext is output.

In the example shown in FIG. 3, the encryption processing part 12 includes r round-function executing parts 20, and is configured such that the round-function executing parts 20 repeat data transformation r times to generate ciphertext. The number of repetitions of the round function is referred to as the number of rounds. In the example shown in FIG. 3, the number of rounds is r.

Data $X_i$ input to each of the round-function executing parts 20 is n-bit data in the encryption process, and a round function output $X_{i+1}$ for a given round is supplied as input for the next round. The other data input to each of the round-function executing parts 20 is based on the expanded key K' output from the key scheduling part 11. The key input to each of the round-function executing parts 20 and used for implementation of the round function is referred to as a round key. In FIG. 3, a round key $RK_i$ is used in the i-th round. The expanded key K' is, for example, concatenated data of the round keys $RK_1$ to $RK_r$ for r rounds.

In the structure of the encryption processing part 12 shown in FIG. 3, as viewed from the input of the encryption processing part 12, input data for the first round is represented by $X_0$, data output from the i-th round function is represented by $X_i$, and a round key for the first round is represented by $RK_i$. The encryption processing part 12 may be configured such that plaintext can be output by, for example, setting a sequence of applied round keys reversely to that in the encryption process and inputting ciphertext to the encryption processing part 12.

The round-function executing parts 20 of the encryption processing part 12 shown in FIG. 3 can have various structures. Round functions are classified according to the structure used in their cipher algorithm. The following are typical structures:

(a) substitution-permutation network (SPN) structure;
(b) Feistel structure; and
(c) generalized Feistel structure.

Figure 4:
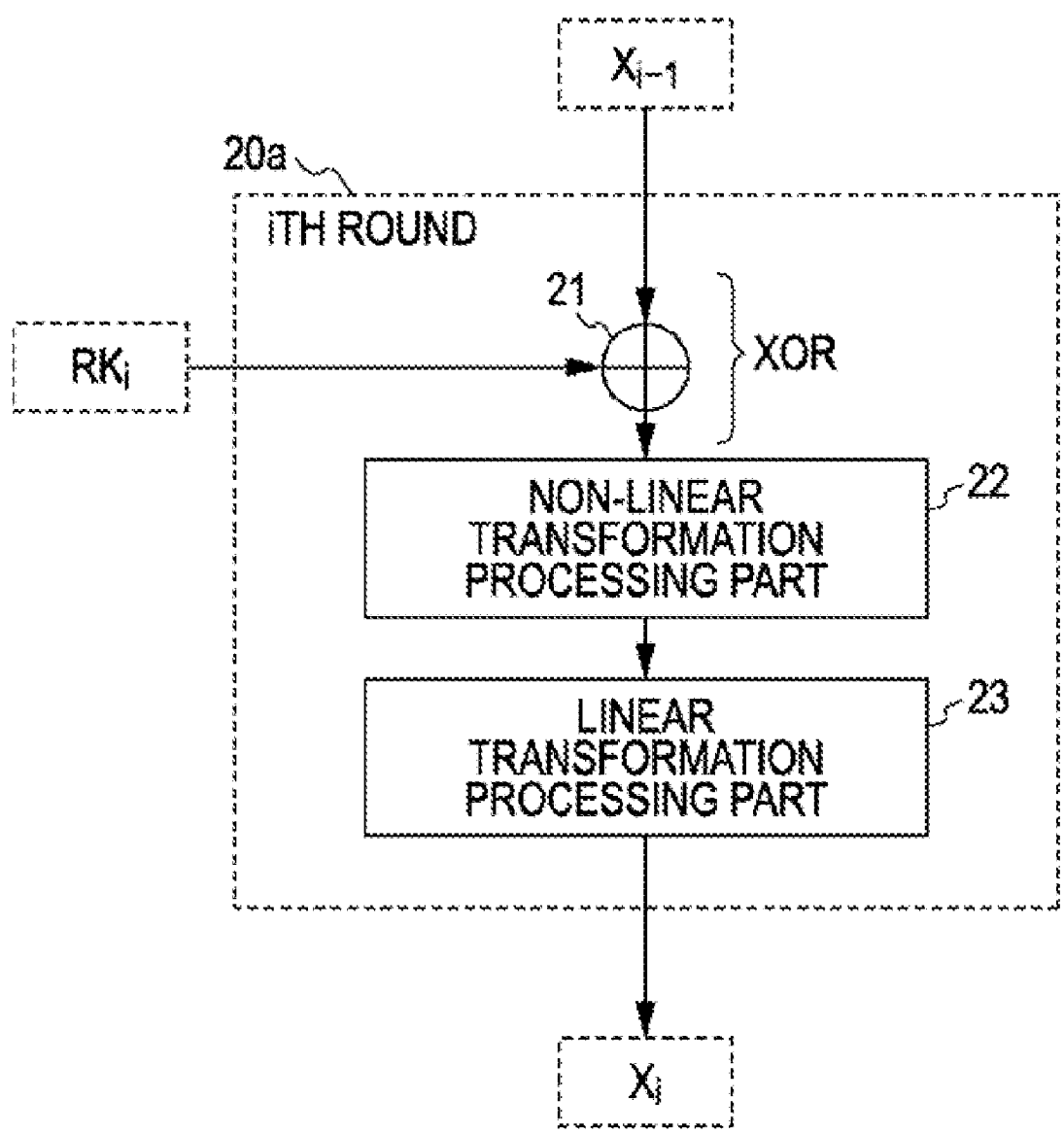
FIG. 4 is a diagram showing an SPN round function, which is an example of the structure of a round-function executing part.

Those structures will be described in detail with reference to FIGS. 4 to 6.

(a) SPN Round Function

First, an SPN round function, which is an example of the structure of the round-function executing parts 20, will be described with reference to FIG. 4. An SPN round-function executing part 20a has a so-called SP-type structure in which a non-linear transformation layer (substitution layer (S-layer)) and a linear transformation layer (permutation layer (P-layer)) are connected. As shown in FIG. 4, the SPN round-function executing part 20a includes an exclusive-OR (XOR) operation part 21, a non-linear transformation processing part 22, and a linear transformation processing part 23. The XOR operation part 21 performs a XOR operation between all bits of n-bit input data and round keys. The calculation results of the XOR operation part 21 are input to the non-linear transformation processing part 22, and the non-linear transformation processing part 22 performs non-linear transformation of the input data. The result of non-linear transformation performed by the non-linear transformation processing part 22 is input to the linear transformation processing part 23, and the linear transformation processing part 23 performs linear transformation on the input data. The result of linear transformation performed by the linear transformation processing part 23 is output to the next round. In the final round, ciphertext is output. In the example shown in FIG. 4, the processing order of the XOR operation part 21, the non-linear transformation processing part 22, and the linear transformation processing part 23 is illustrated. However, the order of those processing parts is not limited to that shown in FIG. 4, and the processing may be performed using any other sequence.

(b) Feistel Structure

The Feistel structure, which is another example of the structure of the round-function executing parts 20, will be described with reference to FIG. 5. In the Feistel structure, as shown in FIG. 5, n-bit input data input from the previous round (in the first round, input text) is divided into two n/2-bit data units, and processing is performed with permutation of the two n/2-bit data units in each round.

Figure 5:
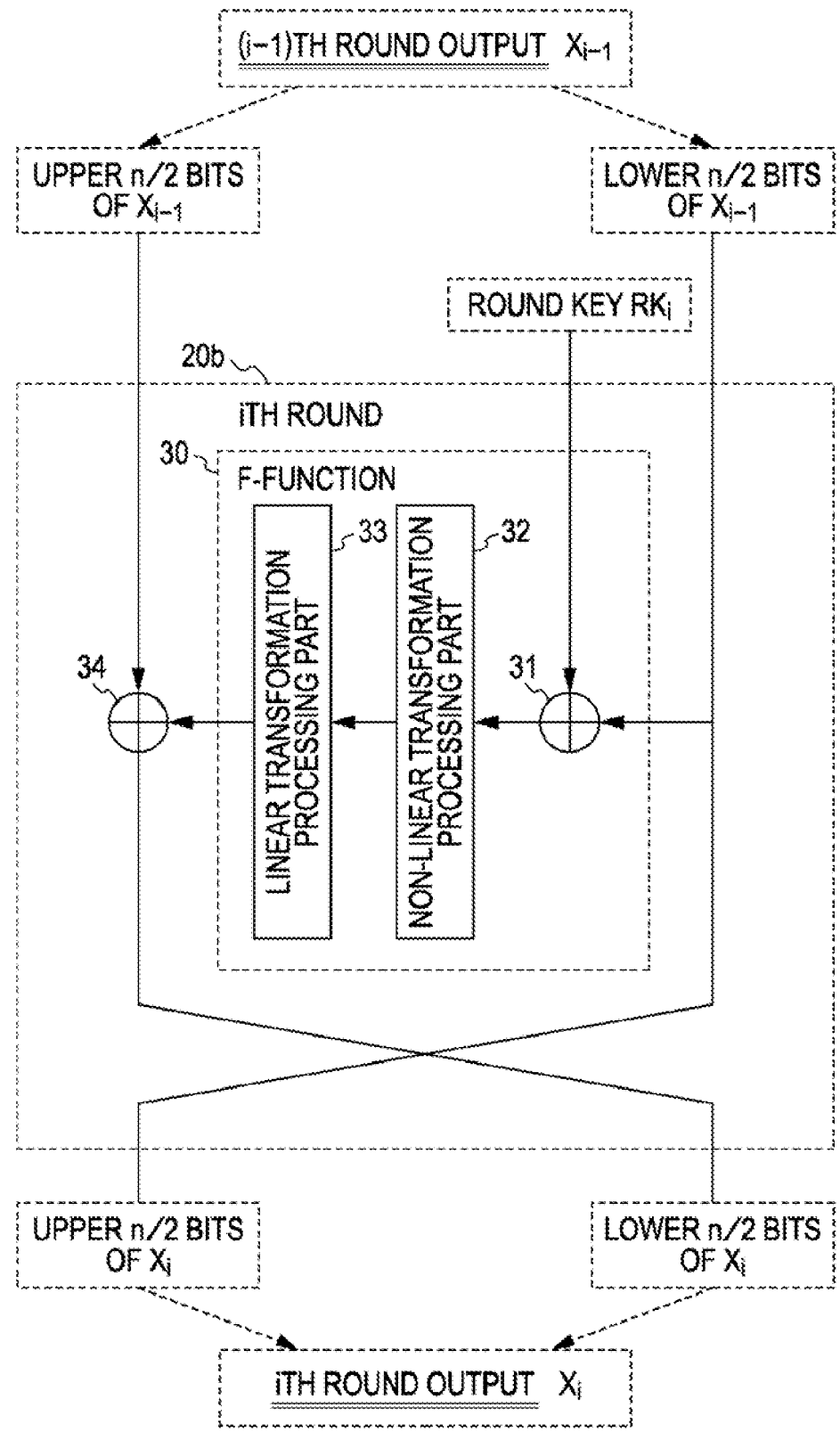
FIG. 5 is a diagram showing a Feistel structure, which is an example of the structure of the round-function executing part.

In the processing using a round-function executing part 20b with the Feistel structure, as shown in FIG. 5, one n/2-bit data unit and a round key are input to an F-function part 30. As with the SPN structure described above, the F-function part 30 has a so-called SP-type structure in which a non-linear transformation layer (S-layer) and a linear transformation layer (P-layer) are connected.

The one n/2-bit data unit and the round key input from the previous round are input to a XOR operation part 31 in the F-function part 30 to perform a XOR operation therebetween. The resulting data is further input to a non-linear transformation processing part 32 to perform non-linear transformation. The result of non-linear transformation is input to a linear transformation processing part 33 to perform linear transformation. The result of linear transformation is output as F-function processing result data.

The resulting F-function output and the other n/2-bit data unit input from the previous round are input to a XOR operation part 34 to perform a XOR operation therebetween. The result of XOR operation is set as an F-function input for the next round. In FIG. 5, n/2 bits set as F-function input for the i-th round are used for a XOR operation with F-function output in the next round. In the Feistel structure, therefore, data transformation is performed using F-functions with alternate permutation of inputs in each round.

(c) Generalized Feistel Structure

The generalized Feistel structure, which is still another example of the structure of the round-function executing parts 20, will be described with reference to FIG. 6. In the Feistel structure described above with reference to FIG. 5, n-bit plaintext is divided into two units, and processing is performed in units of n/2 bits. That is, the processing is performed with the number of divisions d=2. The number of divisions is also referred to as the number of data lines.

In the generalized Feistel structure, the number of data lines (the number of divisions) d is set to any integer more than one. A variety of generalized Feistel structures can be defined according to the value of the number of data lines (the number of divisions) d. In the example shown in FIG. 6, the number of data lines (the number of divisions) d is 4, and n/4-bit data is input to each data line. In each round, one or more F-functions as round functions are executed. In the example shown in FIG. 6, round operations using two F-function parts are performed in one round.

Each of first and second F-function parts 41 and 42 has a structure similar to that of the F-function part 30 described above with reference to FIG. 5, in which XOR operations between round keys and input values, and non-linear and linear transformation processes are performed. The round key input to each of the F-function parts 41 and 42 is adjusted so that the number of bits of the round key is equal to the input bits. In the example shown in FIG. 6, the round key input to each of the F-function parts 41 and 42 has a length of n/4 bits. Those keys are generated by bit-slicing each of round keys forming an expanded key. If the number of data lines (the number of divisions) is d, data input to each data line has a length of n/d bits, and the number of bits of a key input to each of the F-function parts 41 and 42 is also controlled to n/d.

Figure 6:
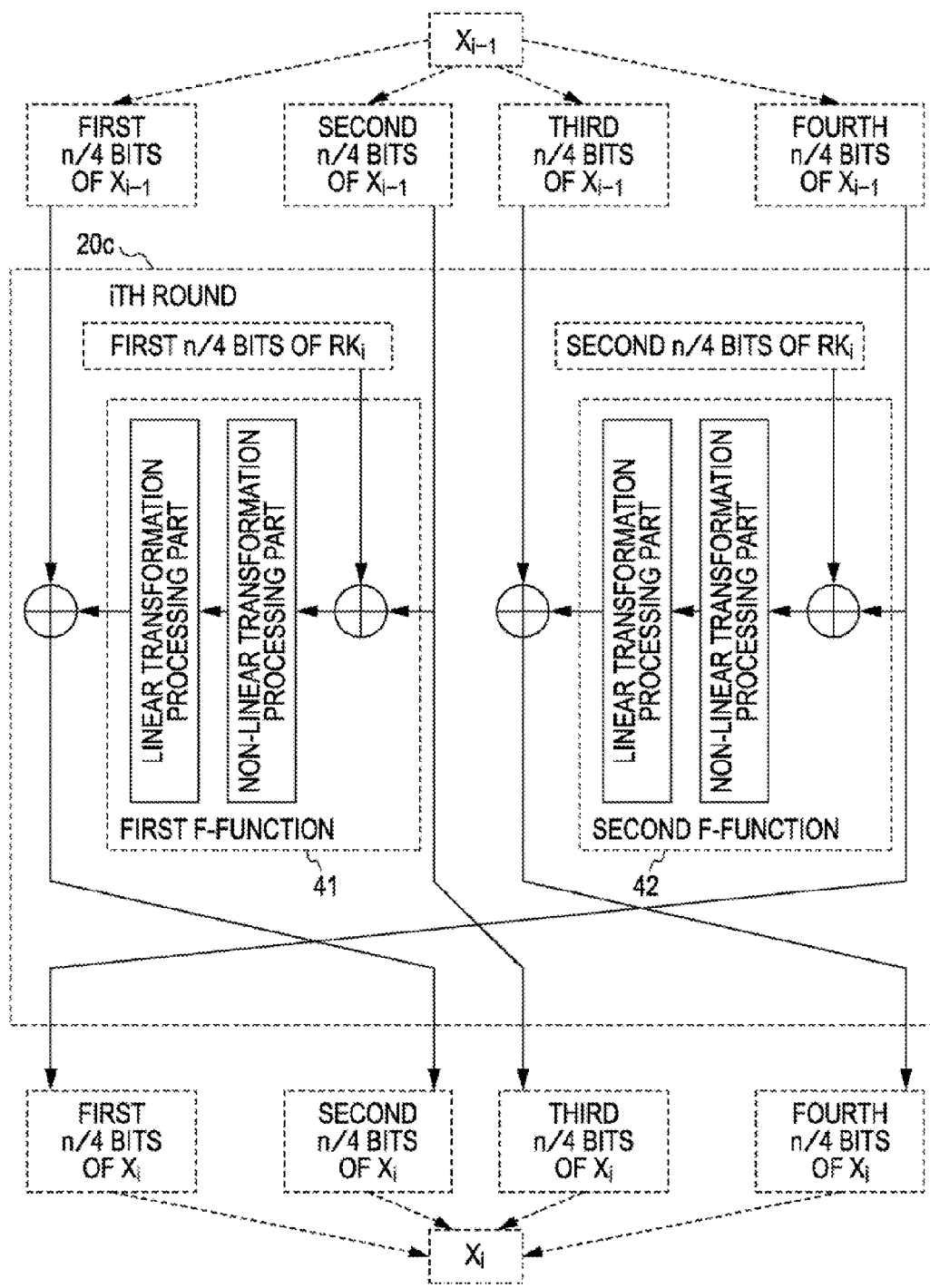
FIG. 6 is a diagram showing a generalized Feistel structure, which is an example of the structure of the round-function executing part.

In the generalized Feistel structure shown in FIG. 6, the number of data lines (the number of divisions) is d, and d/2 F-functions are executed in parallel in each round. In generalized Feistel structures, any number of F-functions between one and d/2, inclusive, may be executed in each round.

As described above with reference to FIGS. 4 to 6, in a common-key blockcipher, the round-function executing parts 20 in the encryption processing part 12 can have the following structures:

(a) SPN structure;
(b) Feistel structure; and
(c) generalized Feistel structure.

Round-function executing parts with the above structures have a so-called SP-type structure in which a non-linear transformation layer (S-layer) and a linear transformation layer (P-layer) are connected. Chat is, such round-function executing parts include a non-linear transformation processing part performing non-linear transformation, and a linear transformation processing part performing linear transformation. The structure of the linear and non-linear transformation processing parts will be described.

Figure 7:
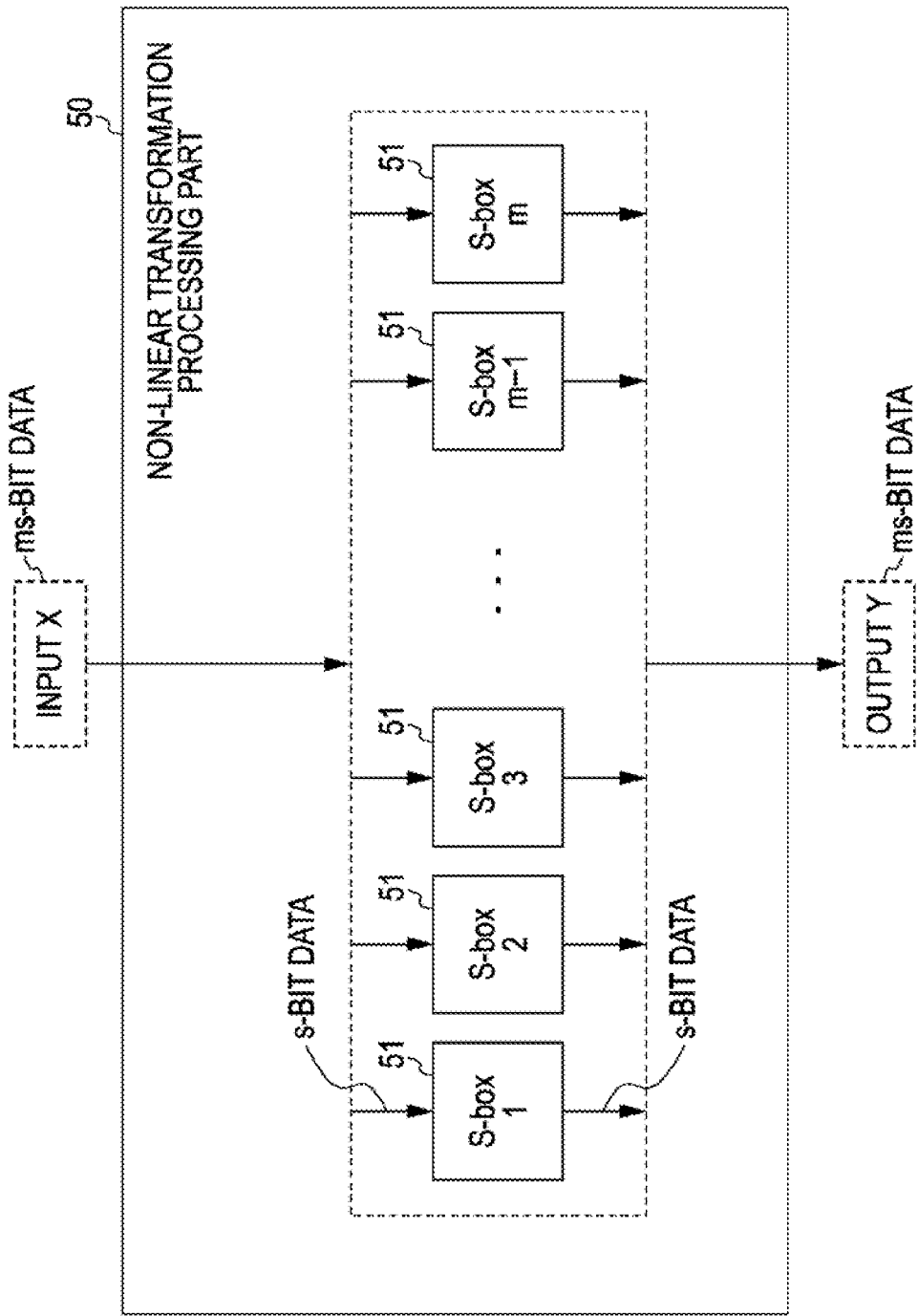
FIG. 7 is a diagram showing a specific example of a non-linear transformation processing part.

A specific example of the non-linear transformation processing part will be described with reference to FIG. 7. As shown in FIG. 7, specifically, a non-linear transformation processing part 50 includes m non-linear transformation tables with s-bit input and s-bit output, called S-boxes 51, and ms-bit input data is divided into s-bit units, which are then input to the corresponding S-boxes 51 to perform data transformation. In each of the S-boxes 51, for example, non-linear transformation using a transformation table is performed.

As the size of input data increases, the cost for implementations tends to increase. To avoid the increase in cost, in many cases, as shown in FIG. 7, target data X to be processed is divided into a plurality of units, and non-linear transformation is applied to each of the units. For example, if the input size is equal to ms bits, the input data is divided into m data units each having s bits, and s bits are input to each of the m S-boxes 51. The input s bits are subjected to, for example, non-linear transformation using a transformation table, and the m s-bit outputs are combined to obtain an ms-bit non-linear transformation result.

Figure 8:
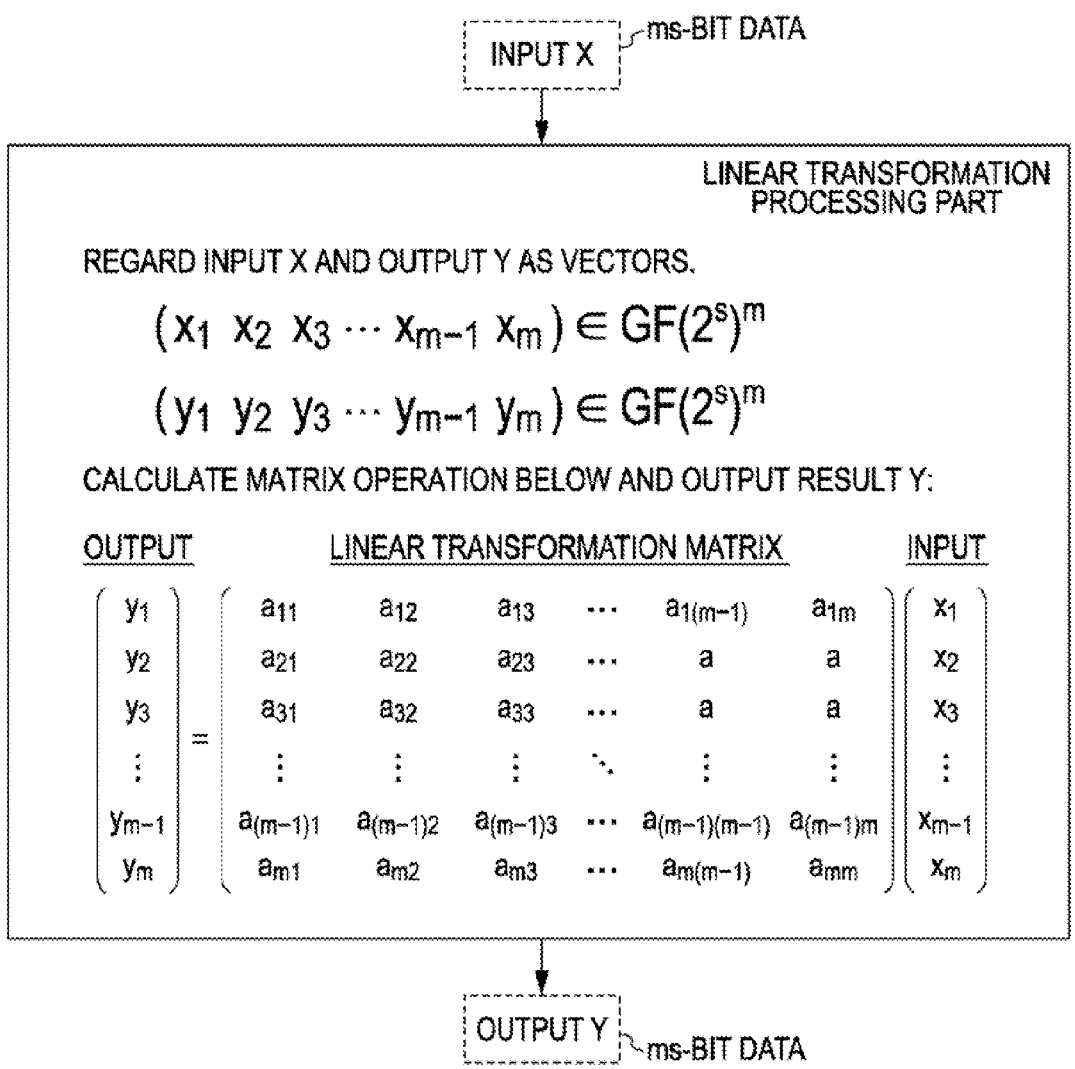
FIG. 8 is a diagram showing a specific example of a linear transformation processing part.

A specific example of the linear transformation processing part will be described with reference to FIG. 8. A linear transformation processing part receives as input an input value X, e.g., an ms-bit output value, which is data output from S-boxes, and applies linear transformation to the input to output an ms-bit result. In the linear transformation process, for example, linear transformation such as permutation of the position of input bits is performed, and an ms-bit output value Y is output. In the linear transformation process, for example, a linear transformation matrix is applied to the input to perform permutation of the position of input bits. A linear transformation matrix shown in FIG. 8 is an example of the matrix.

The elements of the linear transformation matrix applied in the linear transformation processing part can generally be represented by various expressions, such as elements of an extension field $GF(2^8)$ or elements of $GF(2)$. FIG. 8 shows an example of the structure of a linear transformation processing part defined by an m×m matrix with ms-bit input and ms-bit output defined over $GF(2^s)$.

2. Encryption Structure including Generation of Intermediate-Key Data based on x Times Multiplication in Key Scheduling Part As described above, a common-key blockcipher is designed to perform encryption by iterating a round function. A problem with the common-key blockcipher is key leakage due to cryptanalysis. The problem of being easy to break keys by cryptanalysis leads to low cryptographic security, and is serious in practice.

As can be seen from the foregoing description, in a common-key blockcipher, processing using a round key generated in each round on the basis of an expanded key is performed. In some cryptographic attacks, an expanded key is recovered on the basis of the analysis of round keys, and a secret key, which is original data of the expanded key, is analyzed. An example of the structure of an encryption processing apparatus with greater difficulty of key analysis and higher security will now be described.

The following description will be made in accordance with the following items.

(2-1) Detailed Structure of Key Scheduling Part
(2-2) Typical Generation of Intermediate-Key Data
(2-3) Generation of Intermediate-Key Data and Round Keys according to First embodiment of the Present invention
(2-4) Generation of Intermediate-Key Data and Round Keys according to Second Embodiment of the Present Invention (2-1) Detailed Structure of Key Scheduling Part As described above with reference to, for example, FIG. 2, in a common-key blockcipher, a key scheduling part increases the bit length of the input key K, and outputs an expanded key K' (with a bit length k'). Then, a round function using a round key $RK_i$ generated on the basis of the expanded key K' is executed.

The key scheduling part expands key data of, for example, several hundreds of bits to generate expanded key data of about several thousands of bits, and supplies the expanded key data to a data encryption part for executing round functions. A part of the expanded key data, which is to be input to each round function of the data encryption part, is referred to as a round key. Round keys may be inserted in parts other than round functions. For example, a key inserted (XORed) before the first round function is referred to as an initial key, and a key inserted (XORed) after the last round function is referred to as a final key.

Figure 9:
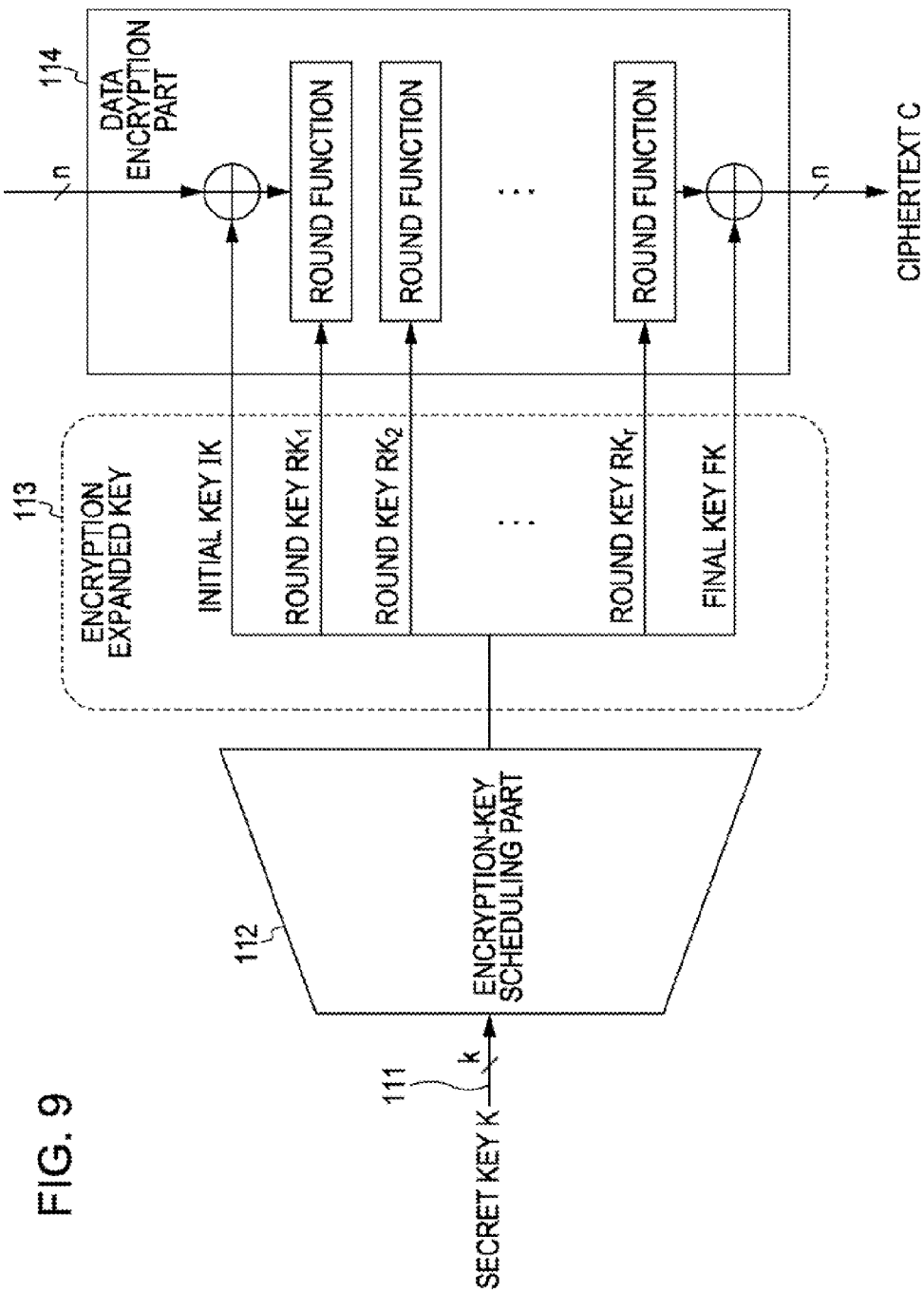
FIG. 9 is a diagram showing the correspondences between a secret key K, an initial key, round keys, and a final key in the encryption process.
Figure 10:
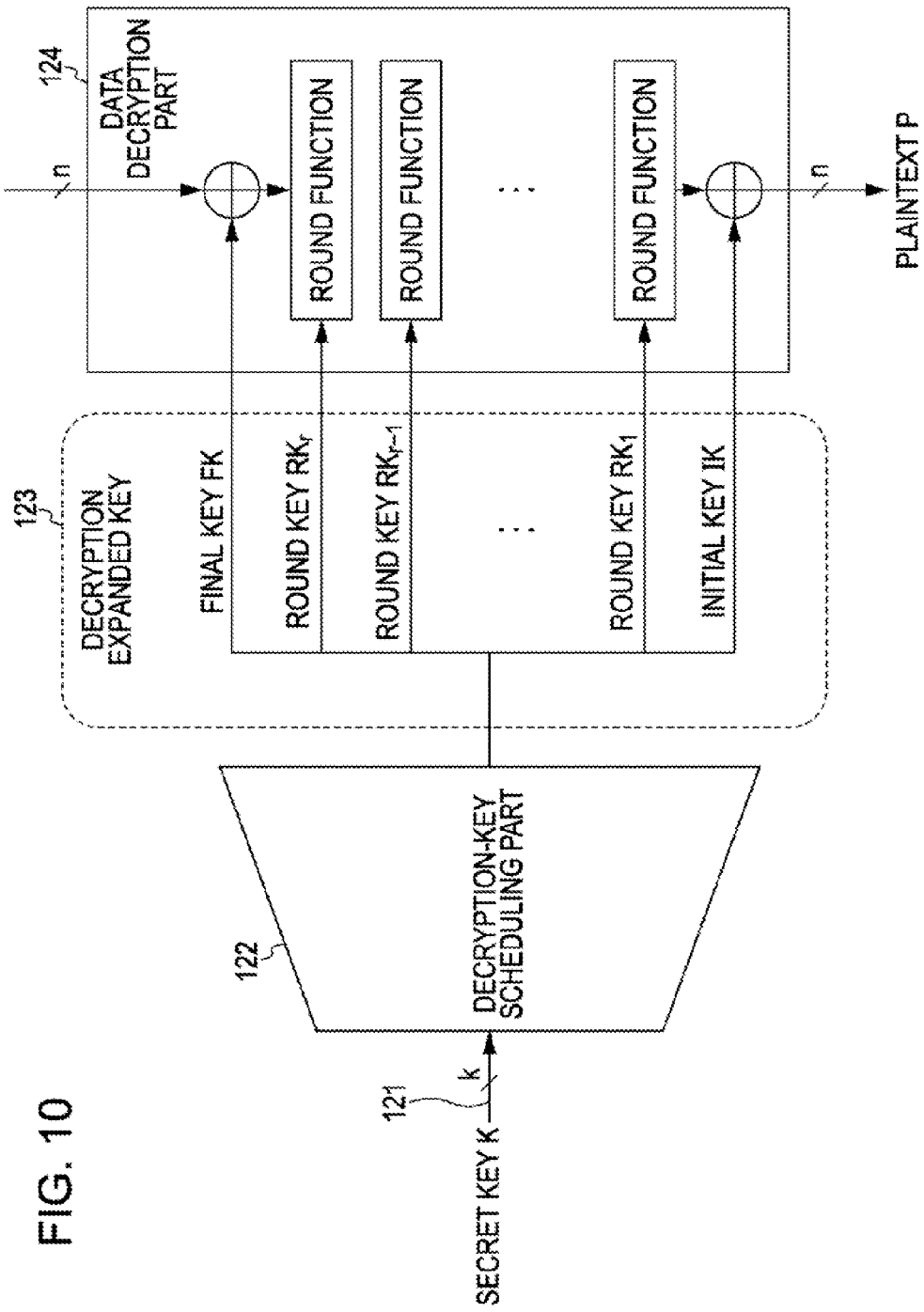
FIG. 10 is a diagram showing the correspondences between a secret key K, an initial key, round keys, and a final key in the decryption process.

The correspondences between a secret key K, an initial key, round keys, and a final key in the encryption and decryption processes will be described with reference to FIGS. 9 and 10. FIGS. 9 and 10 show encryption and decryption structures for performing a blockcipher in r stages, i.e., rounds, respectively.

For example, FIG. 9 shows an encryption structure for performing a blockcipher in r stages, i.e., rounds. A secret key (K) 111 is input to an encryption-key scheduling part 112, and is subjected to data transformation according to a predetermined algorithm such as bit extension to generate an encryption expanded key 113 including an initial key, round keys, and a final key. A data encryption part 114 performs a blockcipher in r stages, i.e., rounds. In the encryption process, the round keys $\{RK_1, RK_2, \ldots, RK_{r-1}, RK_r\}$ are sequentially input to the first to r-th round functions to execute round functions (F-functions). The initial key (IK) and the final key (FK) are also input to the data encryption part 114 to perform a XOR operation with processing data.

FIG. 10 shows a decryption structure. A secret key (K) 121 is input to a decryption-key scheduling part 122, and is subjected to data transformation according to a predetermined algorithm such as bit extension to generate a decryption expanded key 123 including an initial key, round keys, and a final key. The secret key (K) 121 is the same key as the secret key (K) 111 shown in FIG. 9 used in the encryption process.

A data decryption part 124 performs a blockcipher in r stages, i.e., rounds. In the decryption process, the final key (FK) is input to the data decryption part 124 to perform a XOR operation with processing data, and then round keys $\{RK_r, RK_{r-1}, \ldots, RK_2, RK_1\}$ are sequentially input to execute round functions (F-functions). Finally, the initial key (IK) is input to perform a XOR operation with processing data.

In the following description, the initial key and the final key are also referred to as round keys.

The following are desirable characteristics to be satisfied by round keys to achieve a high-security structure with higher resistance to cryptographic attacks based on key analysis, i.e., greater difficulty of key analysis:

(a) Key data is not restored even if a round key is successfully obtained.

(b) Round keys are independent.

The characteristic (a) means that, even if a round key used in each round is compromised, the original secret key is not restored from the round keys and high security is achieved. If there is a relationship in data between one round key and another round key, compromise of one round key results in estimation of the other round keys. The characteristic (b) means that such a relationship is eliminated to improve security.

However, due to the cost of implementations, it is difficult to generate round keys that are independent from each other. In many actual cases, intermediate-key data obtained from a secret key using non-linear transformation is circularly shifted, and the resulting data is cut into data units, which are used as round keys. If the above-described conditions are not fully satisfied, it is important for security to achieve sufficient resistance to slide attacks and sufficient resistance to related cipher attacks.

Slide attacks are attacks in which plaintext and ciphertext having the same data value of the overlapping round function between an original encryption function and an encryption function shifted with respect to the original encryption function are detected to efficiently determine a key in the shifted portion. The slide attacks can be made when round keys for several stages match with respect to different secret keys.

Related cipher attacks are as follows. It is assumed that a certain common-key blockcipher supports a key length of $k_1$ bits with the number of rounds $r_1$ and a key length of $k_2$ bits with the number of rounds $r_2$ (where $r_1 < r_2$ and $k_1 < k_2$). If a round key having the key length of $k_1$ bits matches a portion of a round key having the key length of $k_2$ bits, the output of a data encryption part in the case of the key length of $k_1$ bits can be used to attack the remaining round keys in the case of the key length of $k_2$ bits.

(2-2) Typical Generation of Intermediate-Key Data

As described above, in an apparatus for performing common-key blockcipher processing using the above-described round keys, due to the cost of implementations, it is difficult to generate round keys that are independent from each other, and actually, data units into which data determined by circularly shifting intermediate-key data obtained from a secret key using non-linear transformation are cut and used as round keys.

A typical example of the structure of a key scheduling part in the case where data units into which data determined by circularly shifting intermediate-key data obtained from a secret key using non-linear transformation are cut and used as round keys will be described with reference to FIGS. 11 to 13.

Figure 11:
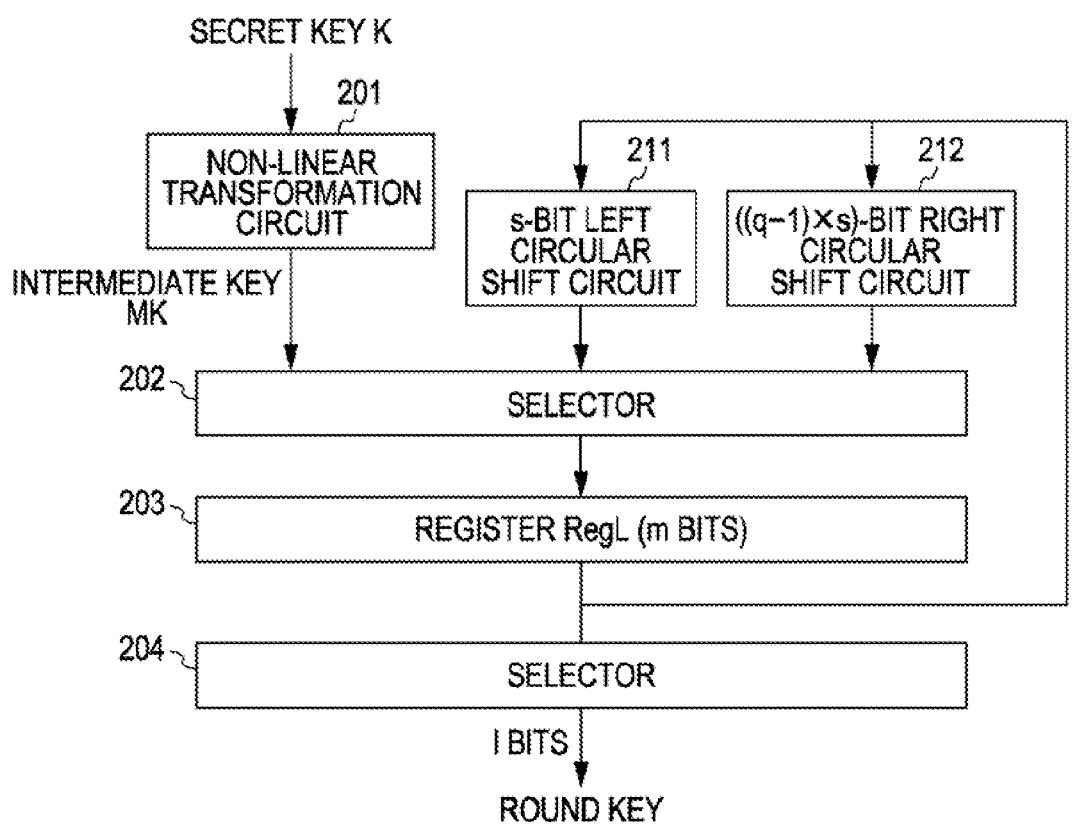
FIG. 11 is a diagram showing an example of the structure of a key scheduling part generating round keys in the encryption process.

FIG. 11 shows an example of the structure of a key scheduling part generating round keys in the encryption process. FIG. 12 shows an example of the structure of a key scheduling part generating round keys in the decryption process. FIG. 13 shows an example of the structure of a key scheduling part generating round keys in both encryption and decryption processes.

First, the structure and operation of the key scheduling part for generating round keys in the encryption process shown in FIG. 11 will be described. A secret key K having k bits is input to a non-linear transformation circuit 201, and is subjected to non-linear transformation to generate m-bit intermediate-key data.

An intermediate key MK is input to a register (hereinafter also referred to as a "round-intermediate-key register") RegL 203 via a selector 202, and is stored in the register RegL 203. The selector 202 is connected to an s-bit left circular shift circuit 211 and a ((q−1)×s)-bit right circular shift circuit 212, where s is an integer of one or more. Circular-shift processing signals from the s-bit left circular shift circuit 211 and the ((q−1)×s)-bit right circular shift circuit 212 are input to the register RegL 203 via the selector 202, and the data stored in the register RegL 203 is subjected to an s-bit left circular shift or a ((q−1)×s)-bit right circular shift.

For example, the s-bit left circular shift circuit 211 performs an s-bit left circular shift of the m-bit intermediate key MK stored in the register RegL 203, and generates q m-bit round intermediate-key data $\{MK_1, MK_2, \ldots, MK_{q-1}, MK_q\}$ from the intermediate key MK stored in the register RegL 203 in the manner as follows:

$$MK_1 = MK$$

$$MK_2 = MK <<< s$$

$$MK_3 = MK <<< (2 \times s)$$

$$\ldots$$

$$MK_{q-1} = MK <<< ((q-2) \times s)$$

$$MK_q = MK <<< ((q-1) \times s)$$

where "<<<s" denotes an s-bit left circular shift.

That is, $MK_1 = MK$ represents data with a shift amount of zero and is equal to the intermediate key MK, $MK_2 = MK <<< s$ represents data circularly shifted to the left by s bits with respect to the intermediate key MK, and $MK_3 = MK <<< (2 \times s)$ represents data shifted to the left by 2×s bits with respect to the intermediate key MK. The same applies to the remaining data units.

If each of round keys including the initial key (IK) and the final key (FK) has l bits, (r+2) l-bit round keys $\{IK, RK_1, RK_2, \ldots, RK_{r-1}, RK_r, FK\}$ are cut from the round intermediate-key data $\{MK_1, MK_2, \ldots, MK_{q-1}, MK_q\}$.

For example, if the number m of bits of the intermediate key MK set in the selector 202 is twice the number (l) of bits of each of the round keys, i.e., m=2×l, the round keys are sequentially cut from the round intermediate-key data without excess or deficiency as follows:

$$IK = (MK_1)_L$$

$$RK_1 = (MK_1)_R$$

$$RK_2 = (MK_2)_L$$

$$RK_3 = (MK_2)_R$$

...

$$RK_{r-2} = (MK_{q-1})_L$$

$$RK_{r-1} = (MK_{q-1})_R$$

$$RK_r = (MK_q)_L$$

$$FK = (MK_q)_R$$

where $(x)_L$ denotes the upper l bits of x, and $(X)_R$ denotes the lower l bits of x, with $q=(r+2)/2$.

The structure and processing of implementations using this method will be described with reference to FIG. 11. First, in the intermediate-key generation process, the k-bit secret key K is input to the non-linear transformation circuit 201 to generate m-bit intermediate-key data MK, and the intermediate-key data MK is stored, without being shifted, in the round-intermediate-key register RegL 203 via the selector 202.

In the encryption process, the processing signal of the s-bit left circular shift circuit 211 is selectively input to the round-intermediate-key register RegL 203 via the selector 202, and an s-bit circular left shift is repeated for the m-bit intermediate-key data MK stored in the round-intermediate-key register RegL 203 to sequentially generate round intermediate-key data $\{MK_1, MK_2, \ldots, MK_{q-1}, MK_q\}$.

The round keys $\{IK, RK_1, RK_2, \ldots, RK_{r-1}, RK_r, FK\}$ are further generated by selecting predetermined data from the round intermediate-key data $\{MK_1, MK_2, \ldots, MK_{q-1}, MK_q\}$ according to a predetermined selection sequence. The selection of the data is performed by a selector 204, and an l-bit round key is output from the selector 204 in each round.

When the round keys $\{IK, RK_1, RK_2, \ldots, RK_{r-1}, RK_r, FK\}$ for all rounds are generated and output using the above-described process, the last data stored in the round-intermediate-key register RegL 203 is circularly shifted to the right by $(q-1) \times s$ bits. This operation is performed by selectively inputting the processing signal of the $((q-1) \times s)$-bit right circular shift circuit 212 to the round-intermediate-key register RegL 203 via the selector 202. With the right shift operation, the data stored in the round-intermediate-key register RegL 203 can be returned to the initial, unshifted intermediate-key data MK.

Figure 12:
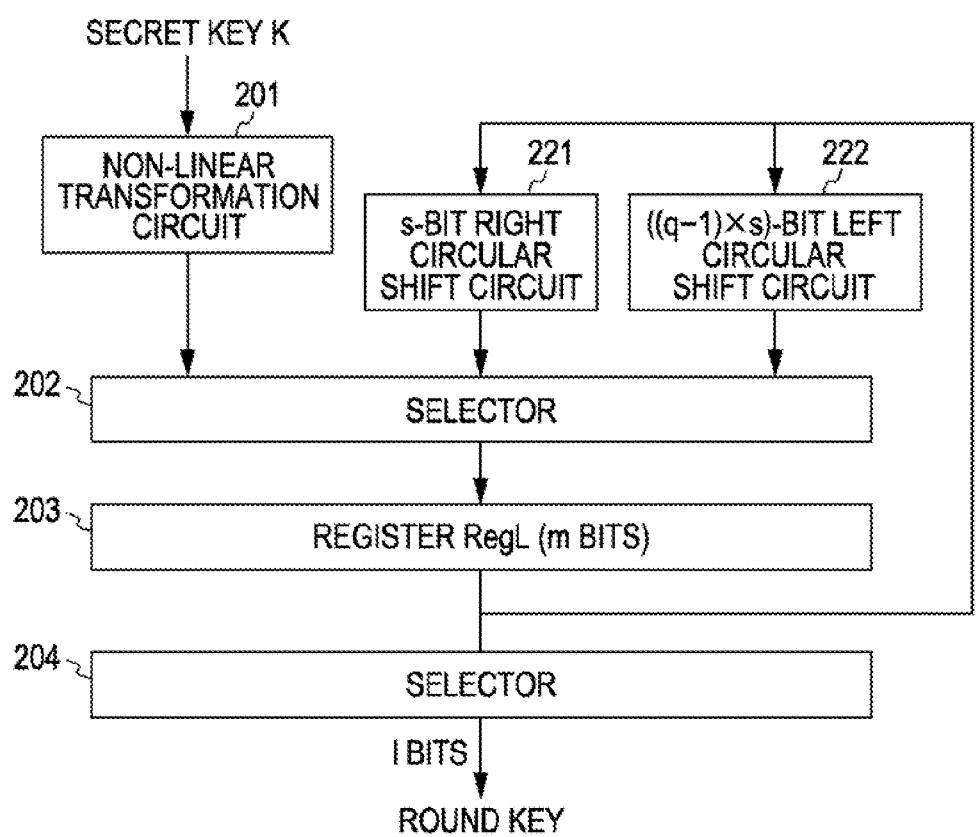
FIG. 12 is a diagram showing an example of the structure of a key scheduling part generating round keys in the decryption process.

FIG. 12 shows an example of the structure of a key scheduling part generating round keys in the decryption process. The key scheduling part generating round keys in the decryption process shown in FIG. 12 includes a non-linear transformation circuit 201, a selector 202, a register RegL 203, and a selector 204, which are similar in structure to those shown in FIG. 11, and further includes shift circuits 221 and 222, which are different from the shift circuits 211 and 212.

The shift circuits 221 and 222 in the decryption process are configured to perform a shift in the direction opposite to that of the shift circuits 211 and 212 in the encryption process. That is, an s-bit right circular shift circuit 221 and a $((q-1) \times s)$-bit left circular shift circuit 222 are provided.

In the key scheduling part in the decryption process, first, the intermediate-key data stored in the register RegL 203 is circularly shifted to the left by $(q-1) \times s$ bits by the $((q-1) \times s)$-bit left circular shift circuit 222. Then, the s-bit right circular shift circuit 221 circularly shifts the data stored in the register RegL 203 to the right by s bits each time a round key is generated in each round. With this processing sequence, the round intermediate-key data is generated in the order reverse to that in the encryption process. That is, the round intermediate-key data $\{MK_q, MK_{q-1}, \ldots, MK_2, MK_1\}$ can be sequentially generated. The round keys are generated by selecting predetermined data from the round intermediate-key data using the selector 204.

FIGS. 11 and 12 show the key scheduling part generating round keys in the encryption process and the key scheduling part generating round keys in the decryption process, respectively. A key scheduling part having both functions can also be used. FIG. 13 shows such a key scheduling part. The key scheduling part shown in FIG. 13 includes circular shift circuits 231 to 234, i.e., an s-bit left circular shift circuit 231, an s-bit right circular shift circuit 232, a $((q-1) \times s)$-bit right circular shift circuit 233, and a $((q-1) \times s)$-bit left circular shift circuit 234.

Figure 13:
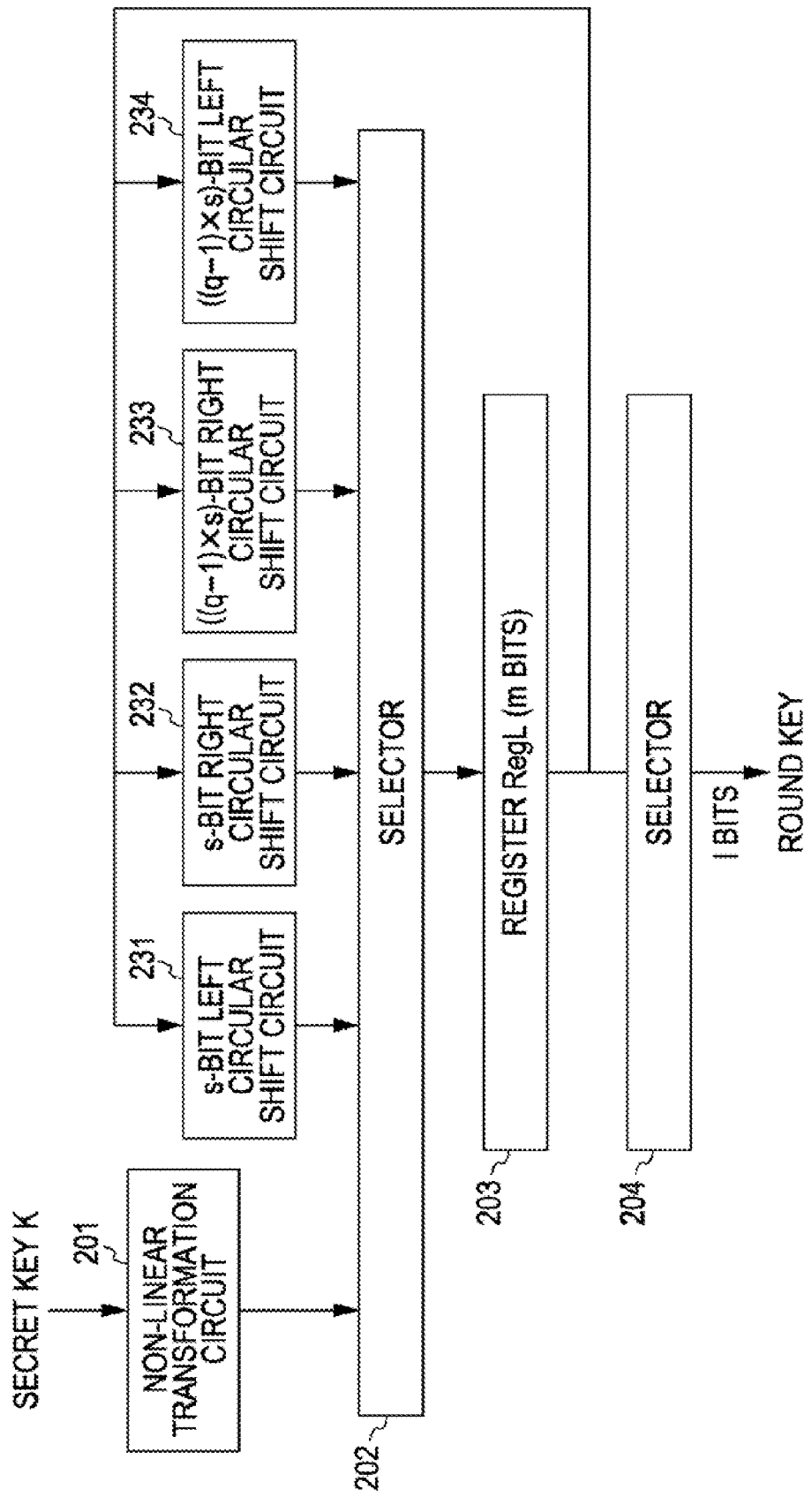
FIG. 13 is a diagram showing an example of the structure of a key scheduling part generating round keys in both encryption and decryption processes.

The key scheduling part shown in FIG. 13 includes all the circular shift circuits shown in FIGS. 11 and 12, and is configured to selectively perform an s-bit left circular shift, an s-bit right circular shift, a $((q-1) \times s)$-bit right circular shift, or a $((q-1) \times s)$-bit left circular shift. With this structure, round keys can be generated and output in both the encryption and decryption processes.

The uniformity of the round intermediate-key data generated by the key scheduling part described above will now be discussed. It is assumed that the round-intermediate-key data, i.e., $MK_1 = MK$, has a sequence of bits $(mk_{m-1}, mk_{m-2}, \ldots, mk_1, mk_0)$.

Then, the round-intermediate-key data $MK_2$ is represented as follows:

$$MK_2 = (MK << < s)$$
$$= (mk_{m-s-1}, mk_{m-s-2}, \ldots, mk_1, mk_0, mk_{m-1}, mk_{m-2}, \ldots, mk_{m-s+1}, mk_{m-s})$$

The XOR operation between the round intermediate-key data $MK_1$ and the round intermediate-key data $MK_2$, i.e., $MK_1(XOR)MK_2$, is set as $MK_1(XOR)MK_2 = (u_{m-1}, u_{m-2}, \ldots, u_1, u_0)$, where (XOR) denotes the exclusive-OR operator, and $(u_{m-1}, u_{m-2}, \ldots, u_1, u_0)$ indicate bits of the result data of an exclusive-OR between the round intermediate-key data $MK_1$ and the round intermediate-key data $MK_2$. The bits are therefore represented as follows:

$$u_{m-1} = mk_{m-1}(XOR)mk_{m-s-1}$$

$$u_{m-2} = mk_{m-2}(XOR)mk_{m-s-2}$$

...

$$u_{s+1} = mk_{s+1}(XOR)mk_1$$

$$u_s = mk_s(XOR)mk_0$$

$$u_{s-1} = mk_{s-1}(XOR)mk_{m-1}$$

...

$u_1 = mk_1(XOR)mk_{m-s+1}$ $u_0 = mk_0(XOR)mk_{m-s}$

The bit $u_0$ can be represented by the equation below using the other bits $u_{m-1}, u_{m-2}, \ldots, u_2, u_1$:

$u_0 = u_{m-1}(XOR)u_{m-2}(XOR), \ldots (XOR)u_2(XOR)u_1$

That is, even if the intermediate-key data MK is random, the bits obtained as a result of a XOR operation between the two round intermediate-key data, i.e., $MK_1(XOR)MK_2$, satisfy the above-described characteristics. Therefore, one bit $u_0$ in m bits ($u_{m-1}, u_{m-2}, u_1$, and $u_0$) can be written by the other bit information, and an information capacity of one bit is lost. The lost of one bit implies that, for example, in bit analysis, the number of bits to be analyzed can be reduced, and is advantageous for cryptographic attacks based on analysis, i.e., key analysis.

For a XOR operation between desired round intermediate-key data, $MK_i(XOR)MK_j (0 \leq i,j \leq q-1, i \neq j)$, an information capacity of one bit is lost.

The lost of an information capacity of one bit for $MK_i(XOR)MK_j$ causes vulnerability to cryptographic attacks because, for example, in the case of an exhaustive search for $MK_i(XOR)MK_j$, due to the small information capacity, the exhaustive search is easily performed to facilitate key analysis.

When intermediate-key data ($MK_1, MK_2, \ldots, MK_{q-1}, MK_q$) is generated using circular shifting, if all bits of the intermediate-key data MK are zero (0) or one (1), all the bits of given round intermediate-key data $MK_1$ are also zero (0) or one (1), resulting in a problem in that all the round keys are the same.

If the value of round intermediate-key data $MK_1$ generated from a secret key K is identical to the value of round intermediate-key data $MK_2'$ generated from another secret key K', the subsequent round intermediate-key data generated by shifting are also identical. That is, the following state is obtained:

$MK_1 = MK_2'$ $MK_2 = MK_3'$ $\ldots$ $MK_{q-2} = MK_{q-1}'$ $MK_{q-1} = MK_q'$ Accordingly, a large number of round intermediate-key data are identical, and round keys generated from the round intermediate-key data are also identical under the same selector conditions. Such keys causes a problem in that the slide attacks described above can be made.

It is now assumed that the key scheduling part supports both a key length of $k_1$ bits with the number of rounds $r_1$ and a key length of $k_2$ bits with the number of rounds $r_2$ (where $r_1 < r_2$ and $k_1 < k_2$). If an intermediate key MK generated from a $k_1$-bit secret key $K_1$ and an intermediate key MK' generated from a $k_2$-bit secret key $K_2$ coincide with each other, round intermediate-key data of the intermediate key MK and round intermediate-key data the intermediate key MK' for the $r_1$ stages are identical. Such a situation causes a problem in that the related cipher attacks described above can be applied.

As described above, the intermediate-key data generating structure described with reference to FIGS. 11 to 13 in which a plurality of intermediate-key data $\{MK_1, MK_2, \ldots, MK_{q-1}, MK_q\}$ are generated by shifting a single intermediate key MK apparently causes vulnerabilities to cryptographic attacks. That is, One bit of information of XORed round intermediate-key data is lost.

Round keys are identical when all bits of intermediate-key data are zero (0) or one (1).

Resistance to the slide attacks is insufficient.

Resistance to the related cipher attack is insufficient.

Therefore, the above-described structure has a drawback of being vulnerable to cryptographic attacks.

(2-3) Generation of Intermediate-Key Data and Round Keys according to First Embodiment of the Present Invention A structure for generating intermediate-key data and round keys to address the foregoing problems with the generation of intermediate-key data using circular shift processing described above, whereby high-security encryption with high resistance to various cryptographic attacks can be achieved, will be described.

A structure in which circular shift processing is not performed but an $x^s$ times multiplication is performed on an intermediate key MK obtained as a result of non-linear transformation based on a secret key K to generate round intermediate-key data will be described.

That is, intermediate-key data $\{MK_1, MK_2, \ldots, MK_{q-1}, MK_q\}$ is generated from an intermediate key MK obtained as a result of non-linear transformation based on the secret key K using an $x^s$ times multiplication over an extension field $GF(2^m)$ generated by an m-th order irreducible polynomial $f(x)$ defined over $GF(2)$, rather than using an s-bit circular shift.

For example, if the number m of bits of the intermediate key MK obtained as a result of non-linear transformation based on the secret key K is set to m=128 and if the m-th order irreducible polynomial is represented by $f(x) = x^{128} + x^7 + x^2 + x^1 + 1$, an x times multiplication over an extension field $GF(2^{128})$ is defined as follows. It is assumed that 128-bit data A and B are:

$A = (a_{127}, a_{126}, \ldots, a_1, a_0)$ $B = (b_{127}, b_{126}, \ldots, b_1, b_0)$ The x times multiplication, i.e., B=Ax, over the extension field $GF(2^{128})$ is represented as follows:

$(a_{127}, a_{126}, \ldots, a_1, a_0) \rightarrow (b_{127}, b_{126}, \ldots b_1, b_0)$ where $b_{127} = a_{126}$ $b_{126} = a_{125}$ $\ldots$ $b_8 = a_7$ $b_7 = a_6(XOR)a_{127}$ $b_6 = a_5$ $b_5 = a_4$ $b_4 = a_3$ $b_3 = a_2$ $b_2 = a_1 (XOR) a_{127}$ $b_1 = a_0 (XOR) a_{127}$ $b_0 = a_{127}$ The above operation indicates the correspondence between the data B obtained by the x times multiplication, i.e., B=Ax, over the extension field $GF(2^{128})$ and the data A. An $x^s$ times multiplication is an operation in which the x times multiplication described above is repeated s times.

An $x^{-1}$ times multiplication, which is inverse transformation of the x times multiplication, is defined as follows:

$x^{-1}$ times multiplication: $B = Ax^{-1}$ $(a_{127}, a_{126}, \ldots, a_1, a_0) \rightarrow (b_{127}, b_{126}, \ldots, b_1, b_0)$ where $b_{127} = a_0$ $b_{126} = a_{127}$ $b_{125} = a_{126}$

...

$b_7 = a_8$ $b_6 = a_0 (XOR) a_7$ $b_5 = a_6$ $b_4 = a_5$ $b_3 = a_4$ $b_2 = a_3$ $b_1 = a_0 (XOR) a_2$ $b_0 = a_0 (XOR) a_1$

The above operation indicates the correspondence between the data B obtained by the $x^{-1}$ times multiplication, i.e., $B=Ax^{-1}$, which is inverse transformation of the x times multiplication over the extension field $GF(2^{128})$, and the data A. An $x^{-s}$ times multiplication is an operation in which the $x^{-1}$ times multiplication described above is repeated s times.

A round-key generation structure using an $x^s$ times multiplication or an $x^{-s}$ times multiplication will be described with reference to FIGS. 14 to 16.

Figure 14:
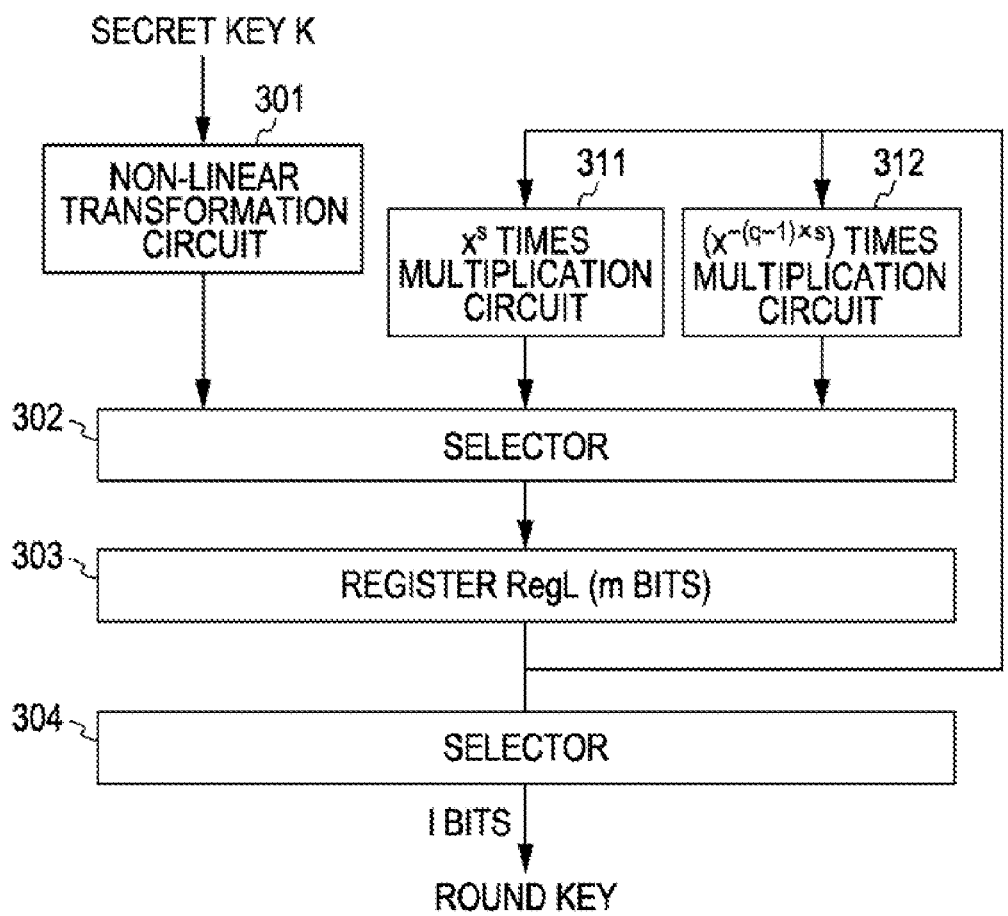
FIG. 14 is a diagram showing an example of the structure of a key scheduling part generating round keys in the encryption process.

FIG. 14 shows an example of the structure of a key scheduling part generating round keys in the encryption process. FIG. 15 shows an example of the structure of a key scheduling part generating round keys in the decryption process. FIG. 16 shows an example of the structure of a key scheduling part generating round keys in both encryption and decryption processes.

First, the structure and operation of the key scheduling part generating round keys in the encryption process shown in FIG. 14 will be described. A secret key K having k bits is input to a non-linear transformation circuit 301, and is subjected to non-linear transformation to generate m-bit intermediate-key data.

An intermediate key MK is input to a register (hereinafter also referred to as a "round-intermediate-key register") RegL 303 via a selector 302, and is stored in the register RegL 303. The selector 302 is connected to an $x^s$ times multiplication 311 and an $x^{-(q-1) \times s}$ times multiplication circuit 312. Processing signals from the $x^s$ multiplication circuit 311 and the $x^{-(q-1) \times s}$ times multiplication circuit 312 are input to the register RegL 303 via the selector 302, and an $x^s$ times multiplication or $x^{(q-1) \times s}$ times multiplication is performed on the data stored in the register RegL 303.

For example, the $x^s$ times multiplication circuit 311 performs an $x^s$ times multiplication of the m-bit intermediate key MK stored in the register RegL 303, and generates q pieces of m-bit round intermediate-key data $\{MK_1, MK_2, \ldots, MK_{q-1}, MK_q\}$ from the intermediate key MK stored in the register RegL 303 in the manner as follows:

$MK_1 = MK$ $MK_2 = MKx^s$ $MK_3 = MKx^{2 \times s}$

...

$MK_{q-1} = MKx^{(q-2) \times s}$ $MK_q = MKx^{(q-1) \times s}$

In the above expressions, $x^s$ indicates an $x^s$ times multiplication over an extension field $GF(2^m)$ generated by an m-th order irreducible polynomial f(x) defined over GF(2), which corresponds to an operation in which the x times multiplication described above is repeated s times, and $x^{2 \times s}$ indicates an operation in which the above-described x times multiplication is repeated 2s times.

If each of round keys including an initial key (IK) and a final key (FK) has l bits, (r+2) l-bit round keys $\{IK, RK_1, RK_2, \ldots, RK_{r-1}, RK_r, FK\}$ are cut and generated from the round intermediate-key data $\{MK_1, MK_2, \ldots, MK_{q-1}, MK_q\}$ generated using the technique described above.

The structure and processing of implementations using this method will be described with reference to FIG. 14. First, in the intermediate key generation process, the k-bit secret key K is input to the non-linear transformation circuit 301 to generate m-bit intermediate-key data MK, and the intermediate-key data MK is stored, without being shifted, in the round-intermediate-key register RegL 303 via the selector 302.

In the encryption process, the processing signal of the $x^s$ times multiplication circuit 311 is selectively input to the round-intermediate-key register RegL 303 via the selector 302, and an $x^s$ times multiplication is repeated for the m-bit intermediate-key data MK stored in the round intermediate-key register RegL 303 to perform the above-described operation, i.e., $MK_1 = MK$ $MK_2 = MKx^s$ $MK_3 = MKx^{2 \times s}$

...

$MK_{q-1} = MKx^{(q-2) \times s}$ $MK_q = MKx^{(q-1) \times s}$

Thus, round intermediate-key data $\{MK_1, MK_2, \ldots, MK_{q-1}, MK_q\}$ are sequentially generated.

The round keys $\{IK, RK_1, RK_2, \ldots, RK_{r-1}, RK_r, FK\}$ are further generated by selecting predetermined data from the round intermediate-key data $\{MK_1, MK_2, \ldots, MK_{q-1}, MK_q\}$ according to a predetermined selection sequence. The selection of the data is performed by a selector 304, and an l-bit round key is output from the selector 304 in each round.

When the round keys (IK, $RK_1, RK_2, \ldots, RK_{r-1}, RK_r$, FK) for all rounds are generated and output using the above-described process, an $x^{-(q-1)\times s}$ times multiplication is performed on the last data stored in the round intermediate-key register RegL 303. This operation is performed by selectively inputting the processing signal of an $x^{-(q-1)\times s}$ times multiplication circuit 312 to the round intermediate-key register RegL 303 via the selector 302. With the $x^{-(q-1)\times s}$ times multiplication, the data stored in the round intermediate-key register RegL 303 can be returned to the initial intermediate-key data MK. That is, the round intermediate-key data generated by the (q−1)-th last $x^s$ times multiplication, i.e., $MK_q = MKx^{(q-1)\times s}$, is subjected to an $x^{-(q-1)\times s}$ times multiplication to return to the original intermediate key MK, which has not been subjected to the $x^s$ times multiplication.

Figure 15:
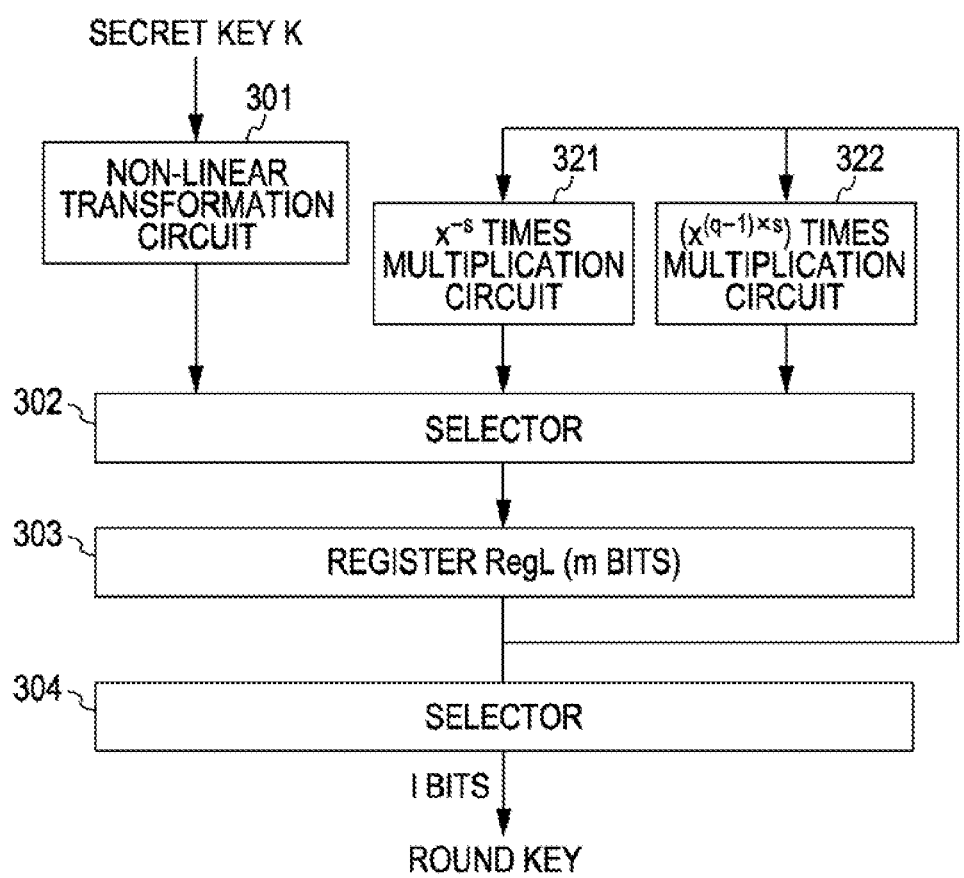
FIG. 15 is a diagram showing an example of the structure of a key scheduling part generating round keys in the decryption process.

FIG. 15 shows an example of the structure of a key scheduling part generating round keys in the decryption process. The key scheduling part generating round keys in the decryption process shown in FIG. 15 includes a non-linear transformation circuit 301, a selector 302, a register RegL 303, and a selector 304, which are similar in structure to those shown in FIG. 14, and further includes multiplication circuits 321 and 322, which are different from the multiplication circuits 311 and 312.

Specifically, the multiplication circuits 321 and 322 in the decryption process are configured to perform an $x^{-1}$ times multiplication, which is inverse transformation of the x times multiplication performed by the multiplication circuits 311 and 312 in the encryption process. That is, an x times multiplication circuit 321 and an $x^{(q-1)\times s}$ times multiplication circuit 322 are provided.

In the key scheduling part in the decryption process, first, the $x^{(q-1)\times s}$ times multiplication circuit 322 performs an $x^{(q-1)\times s}$ times multiplication on the intermediate-key data stored in the register RegL 303. Then, the $x^{-s}$ times multiplication circuit 321 performs an $x^{-s}$ times multiplication on the data stored in the register RegL 303 each time a round key is generated in each round. With this processing sequence, the round intermediate-key data is generated in the order reverse to that in the encryption process. That is, the round intermediate-key data $\{MK_q, MK_{q-1}, \ldots, MK_2, MK_1\}$ can be sequentially generated. The round keys are created by selecting predetermined data from the round intermediate-key data using the selector 304.

FIGS. 14 and 15 show the key scheduling part generating round keys in the encryption process and the key scheduling part generating round keys in the decryption process, respectively. A key scheduling part having both functions can be used. FIG. 16 shows such a key scheduling part. The key scheduling part shown in FIG. 16 includes circuits 331 to 334, namely, an $x^s$ times multiplication circuit 331, an $x^{-s}$ times multiplication circuit 332, an $X^{-(q-1)\times s}$ times multiplication circuit 333, and an $x^{(q-1)\times s}$ times multiplication circuit 334.

Figure 16:
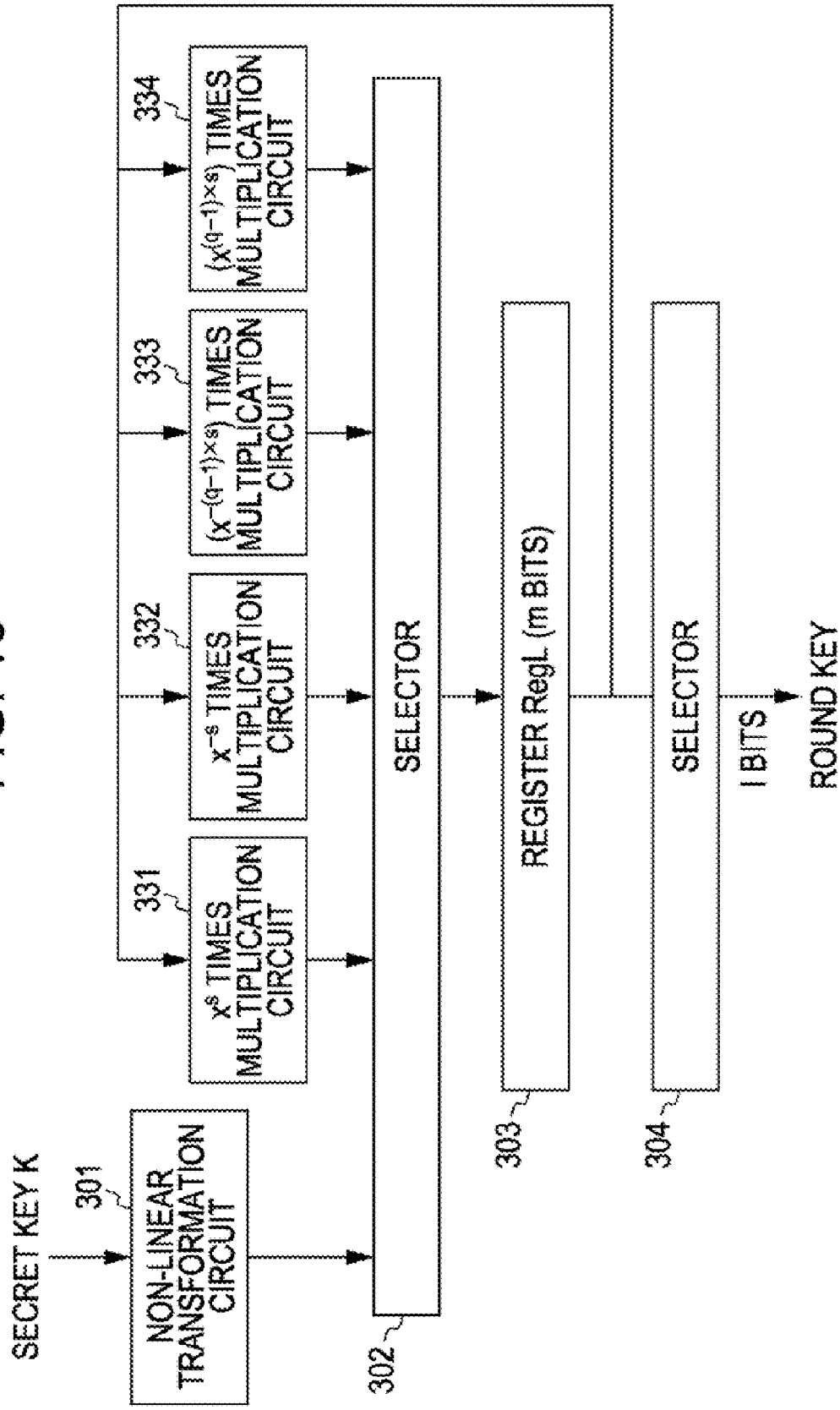
FIG. 16 is a diagram showing an example of the structure of a key scheduling part generating round keys in both encryption and decryption processes.

The key scheduling part shown in FIG. 16 include all the multiplication circuits shown in FIGS. 14 and 15, and is configured to selectively perform an $x^s$ times multiplication, an $x^{-s}$ times multiplication, an $x^{-(q-1)\times s}$ times multiplication, or an $x^{(q-1)\times s}$ times multiplication. With this structure, round keys can be generated and output in both the encryption and decryption processes.

The uniformity of the round intermediate-key data generated by the key scheduling part described above will now be discussed. The XOR operation between two different round intermediate-key data $MK_1$ and round intermediate-key data $MK_2$, i.e., $MK_1(XOR)MK_2$, can be uniquely represented as follows:

$$MK_1(XOR)MK_2 = MK(XOR)MKx^s$$
$$= MK(1(XOR)x^s)$$

On the other hand, the original intermediate key MK without being subjected to any operation can also be uniquely represented as below using the XOR operation between the two different round intermediate-key data $MK_1$ and round intermediate-key data $MK_2$, i.e., $MK_1(XOR)MK_2$:

$$MK = (MK_1(XOR)MK_2)(1(XOR)x^s)^{-1}$$

That is, there is one-to-one correspondence between the original intermediate key MK and the XOR operation between the plurality of different round intermediate-key data $MK_1$ and round intermediate-key data $MK_2$ generated by performing an operation on the intermediate key MK, i.e., $MK_1(XOR)MK_2$. Unlike the intermediate-key data generation structure using the circular shift processing described above, the information capacity corresponding to $MK_1(XOR)MK_2$ is not lost with respect to the intermediate-key data MK.

Similarly, for the XOR operation between any combination of round intermediate-key data, i.e., $MK_i(XOR)MK_j$ ($0 \leq i, j \leq q-1, i \neq j$), the information capacity corresponding thereto is not lost with respect to the intermediate-key data MK. Therefore, bit information, which is not necessary to be analyzed, does not occur in key analysis, resulting in increased difficulty of bit analysis.

As can be seen by $b_1, b_2, b_7$ in the x times multiplication over the extension field $GF(2^{128})$, in an $x^s$ times multiplication, the values obtained by XORing the upper bits of the multiplicand with the lower bits thereof may be assigned to the resulting bits. This may facilitate the permutation of round intermediate-key data compared with the s-bit circular shift processing. By setting (q−1)×s to a value close to the bit length m of the intermediate-key data MK, the permutation of a larger number of round intermediate-key data can be achieved.

The case where all bits of the intermediate-key data MK are one (1) will now be discussed, where $MK = (mk_{m-1}, mk_{m-2}, mk_1, mk_0)$.

In this case, since, as can be seen from the x times multiplication over the extension field $GF(2^{128})$ described above, all bits of data MKx obtained by performing an x times multiplication on the intermediate-key data MK are not one (1) because the bit of the data MKx XORed with the value $mk_{m-1}$ is 0.

Similarly, all bits of data $MKx^s$ are not one (1) either. Therefore, all bits of arbitrary round intermediate-key data $MK_i$ are not one (1), and all the round keys are not identical.

This can increase the difficulty of, for example, the slide attacks described above, and high-security cryptography with high resistance to cryptographic attacks can be achieved.

(2-4) Generation of Intermediate-Key Data and Round Keys According to Second Embodiment of the Present Invention A structure for generating intermediate-key data and round keys according to a second embodiment of the present invention will now be described with reference to FIGS. 17 to 19. The structure according to the following embodiment is configured such that round-key data generated using the structure described above with reference to FIGS. 14 to 16 is XORed with a constant $C_i$ different for each round and the result is set as a round key.

That is, round-key data generated using the structure described above with reference to FIGS. 14 to 16 is XORed with a constant $C_i$ different for each round (i), where $1 \leq i \leq r-1$, and the resulting data is set as a round key.

A round-key generation structure according to the second embodiment in which an $x^s$ times multiplication or $x^{-s}$ times multiplication is used and an exclusive-OR (XOR) operation with a constant C is further applied will be described with reference to FIGS. 17 to 19.

Figure 17:
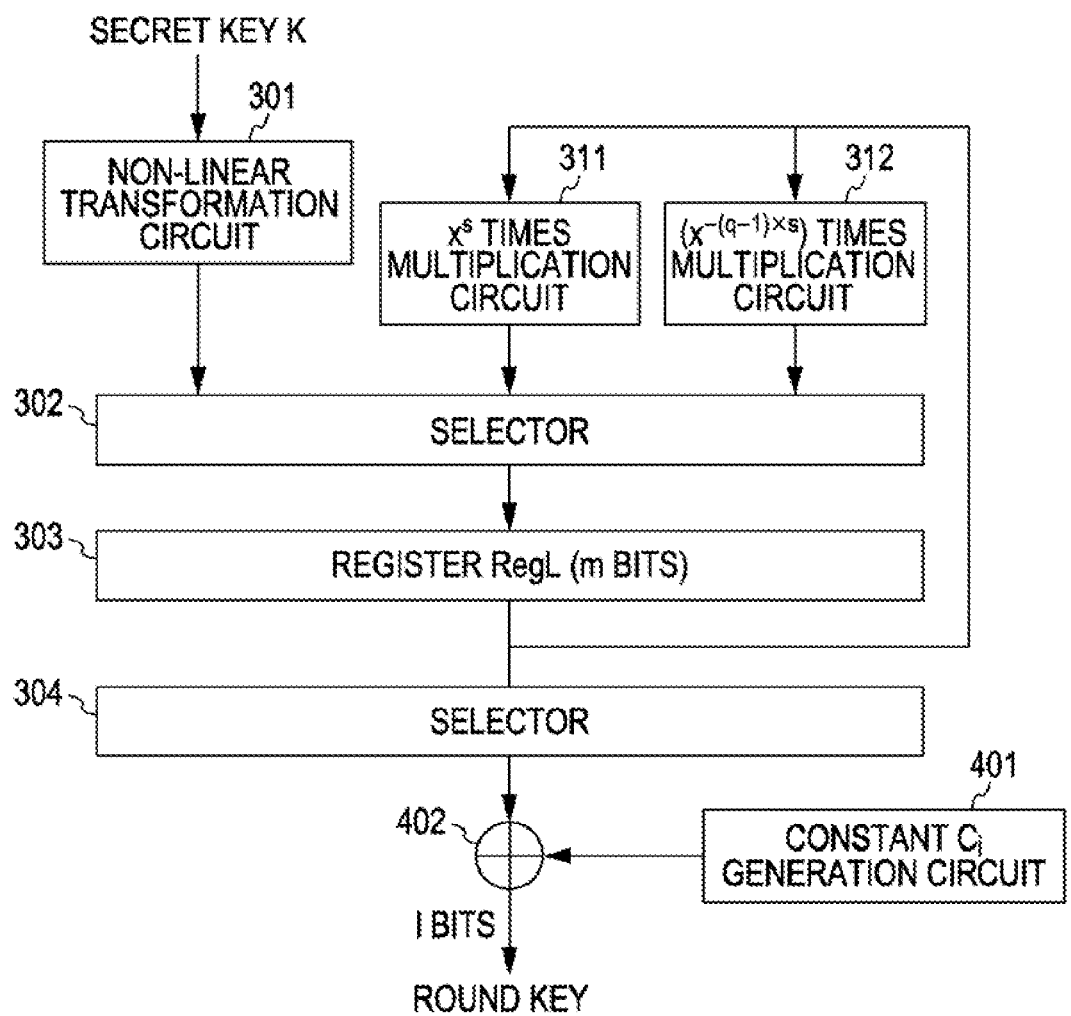
FIG. 17 is a diagram showing an example of the structure of a key scheduling part generating round keys in the encryption process.

FIG. 17 shows an example of the structure of a key scheduling part generating round keys in the encryption process. FIG. 18 shows an example of the structure of a key scheduling part generating round keys in the decryption process. FIG. 19 shows an example of the structure of a key scheduling part generating round keys in both encryption and decryption processes.

The key scheduling part shown in FIG. 17 includes, a constant ($C_i$) generation circuit 401 and an XOR operation part 402 in addition to the above-described round-key generation structure for generating round keys in the encryption process based on an $x^s$ times multiplication shown in FIG. 14. The constant ($C_i$) generation circuit 401 generates a constant $C_i$ different for each round (i), where $1 \leq i \leq r-1$. The XOR operation part 402 performs a XOR operation between the data for each round selected by the selector 304 and the constant $C_i$ ($1 \leq i \leq r-1$) for each round generated by the constant ($C_i$) generation circuit 401. In the second embodiment, the results of the operation performed by the XOR operation part 402 are output as round keys {IK, $RK_1$, $RK_2$, ..., $RK_{r-1}$, $RK_r$, FK}.

Figure 18:
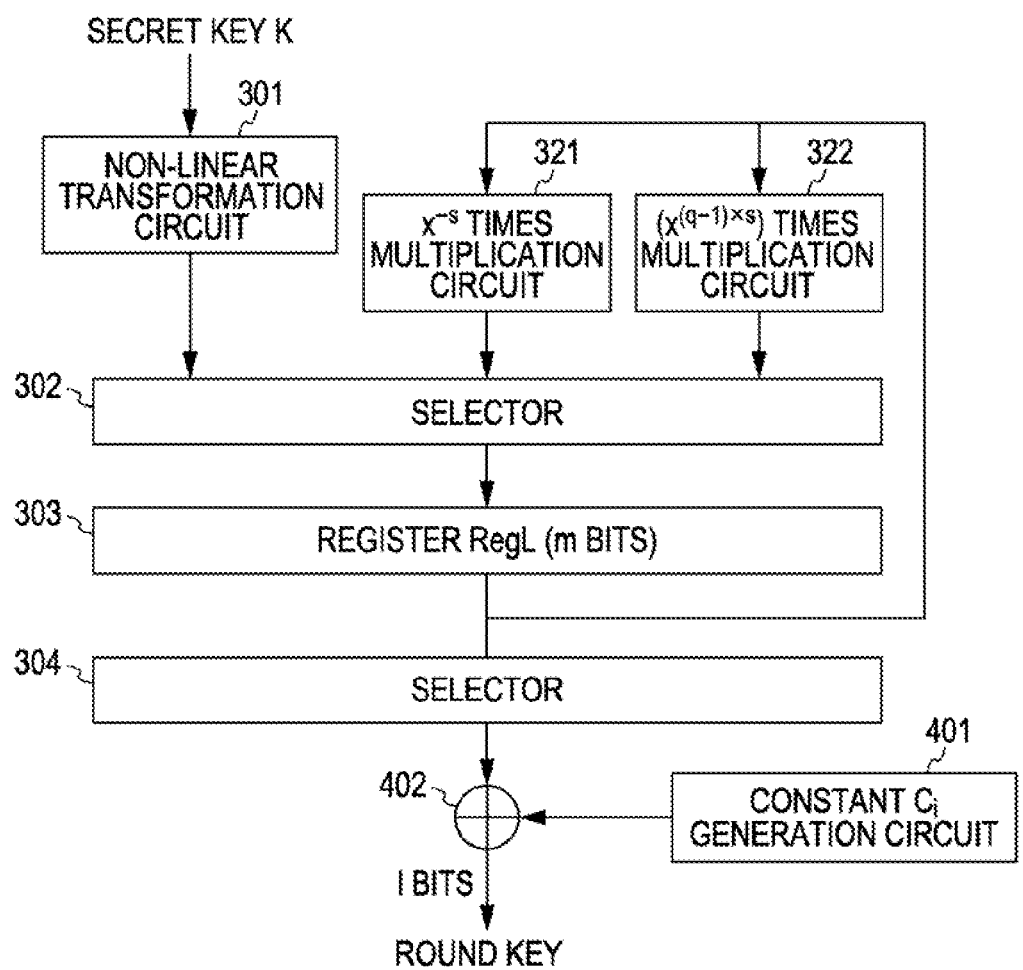
FIG. 18 is a diagram showing an example of the structure of a key scheduling part generating round keys in the decryption process.

The key scheduling part shown in FIG. 18 includes a constant ($C_i$) generation circuit 401 and a XOR operation part 402 in addition to the above-described round-key generation structure for generating round keys in the decryption process based on an $x^{-s}$ times multiplication shown in FIG. 15. The key scheduling part shown in FIG. 19 is configured to achieve both the structures shown in FIGS. 17 and 18, in which a constant ($C_i$) generation circuit 401 and a XOR operation part 402 are provided in addition to the above-described structure shown in FIG. 16.

In the structures described above, a XOR operation is performed between the data for each round output from the selector 304 and the constant $C_i$ different for each round, and the result is set as a round key. This is a measure to prevent finally output round keys {IK, $RK_1$, $RK_2$, ..., $RK_{r-1}$, $RK_r$, FK} from being identical, for example, when all bits of the intermediate-key data MK are zero (0).

Figure 19:
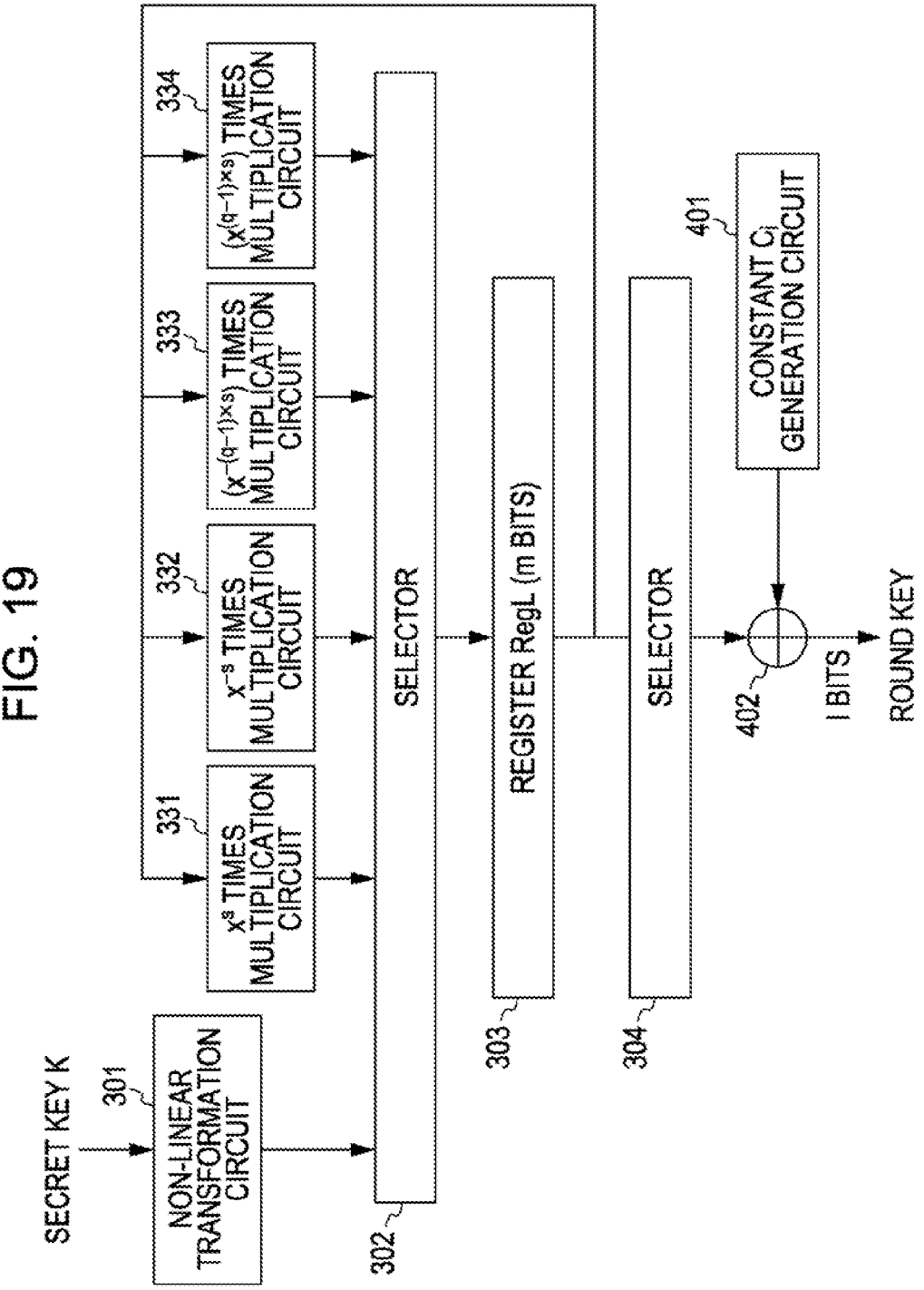
FIG. 19 is a diagram showing an example of the structure of a key scheduling part generating round keys in both encryption and decryption processes.

For example, in the structures shown in FIGS. 17 to 19, when all bits of the intermediate-key data MK stored in the register RegL 303 are zero (0), all bits of the round intermediate-key data $MK_1$ generated by performing an $x^s$ times multiplication or $x^{-s}$ times multiplication are zero (0). In the structures shown in FIGS. 17 to 19, a XOR operation is performed between the data for each round output from the selector 304 and the constant $C_i$ different for each round, and the result is set as a round key. Due to the XOR operation with the constant $C_i$ different for each round, the round keys are not identical.

Further, if round intermediate-key data $MK_1$ generated from a secret key K and round intermediate-key data $MK_2'$ generated from another secret key K' have the same value, the subsequent intermediate-key data are identical. With respect to the round keys, however, due to the XOR operation with the constant $C_i$ different for each round, the round keys are not identical. Therefore, the slide attacks described above can be avoided.

The case where the key generation structure shown in FIGS. 17 to 19 supports a plurality of key lengths will be discussed. A constant different for each round is changed according to the key length, thus obtaining round keys having different values even if the intermediate-key data MK have the same value in different key lengths. The resistance to the related cipher attacks can therefore be improved.

For example, if a key length of $k_1$ bits with the number of rounds $r_1$, a key length of $k_2$ bits with the number of rounds $r_2$, and a key length of $k_3$ bits with the number of rounds $r_3$ are all supported, a total of $r_1+r_2+r_3$ different l-bit constants $C_i$ are used to perform a XOR operation. Therefore, even if intermediate-key data MK has the same value in different key lengths, the values of the round keys can be different.

A circuit for generating r l-bit constants each different for each round according to the number of rounds r is large in size if the number l of bits is large. To overcome this problem, for example, l-bit data is divided into w-bit data units $b_i$ different for each round, and the data units $b_i$ are repeatedly used l/w times. With this structure, the circuit size can be reduced.

For example, if the number l of bits is 64, a 64-bit constant different for each round, i.e., an constant $C_i$ used for a round i, is represented by a sequence of 8 bits $b_i$, which is different for each round (i), as follows:

$$C_i=(b_i,b_i,b_i,b_i,b_i,b_i,b_i,b_i)$$

Accordingly, a sequence of 8 bits $b_i$ different for each round is repeatedly used to reduce the size of the constant generation circuit.

Alternatively, a constant $C_i$ may be generated in the following manner:

$$C_i=(b_i,b_i,b_i,b_i,\sim b_i,\sim b_i,\sim b_i,\sim b_i)$$

That is, the constant $C_i$ may be generated using data bits $b_i$ and inverse data bits $\sim b_i$ of the bits $b_i$.

Alternatively, the circuit may be configured such that the constituent bits $b_i$ of the constant $C_i$ used for the round i are updated for each round from a certain initial value according to a predetermined rule to reduce the size of the circuit. The rule may be an x times multiplication over an extension field $GF(2^w)$ generated by a w-th order irreducible polynomial f(x) defined over GF(2).

For example, if w=8 and the w-th order irreducible polynomial is defined by $f(x)=x^8+x^4+x^3+x^2+1$, the bits $b_i=(d_7, d_6, \ldots, d_1, d_0)$ is represented as follows using $b_{i-1}=(c_7, c_6, \ldots, c_1, c_0)$:

$$d_7=c_6$$

$$d_6=c_5$$

$$d_5=c_4$$

$$d_4=c_3(XOR)c_7$$

$$d_3=c_2(XOR)c_7$$

$$d_2=c_1(XOR)c_7$$

$$d_1=c_0$$

$$d_0=c_7$$

Therefore, the bits $b_i$ are updated in the manner described above. If the w-th order irreducible polynomial f(x) is a primitive polynomial, the interval during which the value of the x times multiplication is generated from a certain initial value is given by $2^w-1$, and $2^w-1$ pieces of different data can be generated. Another example of the above-described rule may include an $x^{-1}$ times multiplication over an extension field $GF(2^w)$.

In the second embodiment, therefore, the problem that has not been addressed by the structure of the first embodiment is overcome, and a key scheduling part satisfying the conditions below is achieved:

the information of XORed round intermediate-key data is not lost;
round keys are not identical even if all bits of intermediate-key data are zero (0) or one (1);
resistance to the slide attacks is sufficient; and
resistance to the related cipher attacks is sufficient.

Accordingly, an encryption processing apparatus according to an embodiment of the present invention includes an encryption processing part that performs data transformation in which a round function is iterated for a plurality of rounds; and a key scheduling part that generates round keys used to execute the round function, wherein the key scheduling part repeatedly applies an $x^s$ times multiplication over an extension field $GF(2^m)$, generated by an m-th order irreducible polynomial $f(x)$ defined over $GF(2)$, to an m-bit intermediate key generated by transformation of a secret key, and generates a plurality of different round intermediate keys serving as data for generating a plurality of different round keys. The round keys generated by the key scheduling part include a round key used to execute a round function, an initial key used for initial data transformation before the round function is executed, and a final key used for final data transformation after the round function is executed.

Specifically, the key scheduling part repeatedly applies an $x^s$ times multiplication over an extension field $GF(2^m)$, generated by an m-th order irreducible polynomial $f(x)$ defined over $GF(2)$, to an m-bit intermediate key MK generated by transformation of the secret key, and generates q round intermediate keys $\{MK_1, MK_2, \ldots, MK_{q-1}, MK_q\}$ according to the following expressions:

$$MK_1 = MK$$

$$MK_2 = MKx^s$$

$$MK_3 = MKx^{2 \times s}$$

$$\ldots$$

$$MK_{q-1} = MKx^{(q-1) \times s}$$

$$MK_q = MKx^{(q-1) \times s}.$$

Further, when the number of round intermediate keys to be generated is q, the key scheduling part repeats the $x^s$ times multiplication to generate q different round intermediate keys, and then applies an $x^{-(q-1) \times s}$ times multiplication to round-intermediate-key data generated by the (q−1)-th last $x^s$ times multiplication, given by $MK_q = MKx^{(q-1) \times s}$, to return to an original intermediate key MK that has not been subjected to the $x^s$ times multiplication.

Further, in the structure described above according to the second embodiment described above, the key scheduling part performs bit selection of constituent data of the round intermediate keys generated by repeating the $x^s$ times multiplication to generate round keys used to execute the round function in the encryption processing part.

The round keys generated by the key scheduling part having the above-described structure have features of, as described above, no lost of information of XORed round intermediate-key data and different round keys obtained even if all bits of intermediate-key data are zero (0) or one (1). High-security encryption with sufficient resistance to attacks such as the slide attacks or the related cipher attacks can be achieved.

3. Example Structure of Encryption Processing Apparatus

FIG. 20 shows an example of the structure of an IC module 700 serving as an encryption processing apparatus configured to perform encryption according to the above-described embodiments. The processes described above can be executed by, for example, a personal computer (PC), an IC card, a reader/writer, or any other information processing apparatus, and the IC module 700 shown in FIG. 20 can be incorporated in such various apparatuses.

Referring to FIG. 20, a central processing unit (CPU) 701 is a processor for executing programs for starting encryption, ending encryption, controlling transmission and reception of data, controlling data transfer between the element parts of the IC module 700, and other various programs. A memory 702 includes a read-only-memory (ROM) for storing the programs executed by the CPU 701 or fixed data such as calculation parameters, and a random access memory (RAM) used as a storage area or a work area for storing the programs executed in the processing of the CPU 701 and parameters changed as necessary in the program processing. The memory 702 can also be used as a storage area for key data necessary for encryption, a transformation table (permutation table) used in the encryption process, data used in a transformation matrix, etc. The data storage area is preferably a memory having a tamper-resistant structure.

An encryption processor 703 performs encryption and decryption according to a common-key blockcipher algorithm having any of the above-described encryption processing structures, i.e., (a) SPN structure, (b) Feistel structure, and (c) generalized Feistel structure.

The encryption processor 703 includes a key scheduling part having any of the above-descried structures according to the embodiments described above, i.e., the structure for generation of intermediate-key data and round keys according to the first embodiment of the present invention and the structure for generation of intermediate-key data and round keys according to the second embodiment of the present invention.

While the encryption processor 703 is provided as a separate module by way of example, such an independent encryption processing module may not be provided. For example, an encryption processing program may be stored in the ROM, and the CPU 701 may read the program stored in the ROM and may execute the read program.

A random-number generator 704 generates random numbers used for generation of keys or the like in the encryption process.

A transmitter/receiver 705 is a data communication processor for performing data communication with an external apparatus. For example, the transmitter/receiver 705 performs data communication with an IC module such as a reader/writer to output ciphertext generated in the IC module or to input data from an external apparatus such as a reader/writer.

The present invention has been described in detail with respect to specific embodiments thereof. However, it is to be understood that a variety of modifications or alterations can be made by persons skilled in the art without departing from the scope of the present invention. That is, exemplary embodiments of the present invention have been disclosed, and are not construed as limiting the present invention. The scope of the present invention should be determined by the appended claims.

The series of processes described in herein can be implemented by hardware or software, or a combination thereof. When the series of processes is implemented by software, a program having a processing sequence may be installed into an internal memory of a computer incorporated in special hardware and executed, or may be installed onto a general-purpose computer capable of executing various types of processing and executed.

The program may be recorded in advance on a recording medium such as a hard disk or a ROM. Alternatively, the program may be temporarily or persistently stored (or recorded) in a removable recording medium such as a flexible disk, a compact disc read only memory (CD-ROM), a magneto-optical (MO) disk, a digital versatile disc (DVD), a magnetic disk, or a semiconductor memory. Such removable recording media can be provided as packaged software.

The program is installed onto a computer from such a removable recording medium, or wirelessly transferred to the computer from a download site or transferred via wire to the computer via a network such as a local area network (LAN) or the Internet so that the computer can receive the program transferred in the manner described above and can install the program into a recording medium such as an internal hard disk.

In this specification, steps defining the programs stored in the program recording medium may include processes that are executed in parallel or individually, as well as processes that are executed in the orders described herein, according to the performance of the apparatus that performs the processes. The term system as used herein refers to a logical set of apparatuses regardless of whether or not the apparatuses are housed in a single housing.

It should be understood by those skilled in the art that various modifications, combinations, sub-combinations and alterations may occur depending on design requirements and other factors insofar as they are within the scope of the appended claims or the equivalents thereof.

What is claimed is:

1. An encryption processing apparatus for performing common-key blockcipher processing, the encryption processing apparatus comprising:
   an encryption processor, comprising:
      an encryption processing part that is configured to perform data transformation in which a round function is iterated for a plurality of rounds, and
      a key scheduling part that is configured to generate round keys used to execute the round function,
      wherein the key scheduling part includes:
         a first intermediate key generating part that is configured to generate an m-bit first intermediate key by transformation of a secret key,
         a second intermediate key generating part that is configured to generate a plurality of different second intermediate keys by repeatedly applying an $x^s$ times multiplication over an extension field $GF(2^m)$, generated by an m-th order irreducible polynomial $f(x)$ defined over $GF(2)$, to said first intermediate key, and
         a round key generating part that is configured to generate a plurality of different round keys based on said second intermediate keys.

2. The encryption processing apparatus according to claim 1, wherein the key scheduling part is configured to repeatedly apply an $x^s$ times multiplication over an extension field $GF(2^m)$, generated by an m-th order irreducible polynomial $f(x)$ defined over $GF(2)$, to an m-bit intermediate key MK generated by transformation of the secret key to generate q round intermediate keys $\{MK_1, MK_2, \ldots, MK_{q-1}, MK_q\}$ according to the following expressions:

$MK_1 = MK$ $MK_2 = MKx^s$ $MK_3 = MKx^{2 \times s}$ $\ldots$ $MK_{q-1} = MKx^{(q-2) \times s}$ $MK_q = MKx^{(q-1) \times s}.$ 3. The encryption processing apparatus according to claim 1, wherein when the number of round intermediate keys to be generated is q, the key scheduling part is configured to repeat the $x^s$ times multiplication to generate q different round intermediate keys, and is configured to then apply an $x^{-(q-1) \times s}$ times multiplication to round-intermediate-key data generated by the (q−1)-th last $x^s$ times multiplication, given by $MK_q = MKx^{(q-1) \times s}$, to return to an original intermediate key MK that has not been subjected to the $x^s$ times multiplication.

4. The encryption processing apparatus according to claim 1, wherein the key scheduling part is configured to perform bit selection of constituent data of the round intermediate keys generated by repeating the $x^s$ times multiplication to generate round keys used to execute the round function in the encryption processing part.

5. The encryption processing apparatus according to claim 1, wherein the key scheduling part is configured to perform bit selection of constituent data of the round intermediate keys generated by repeating the $x^s$ times multiplication to generate keys including round keys used to execute the round function in the encryption processing part, an initial key used for initial data transformation before the round function is executed, and a final key used for final data transformation after the round function is executed.

6. The encryption processing apparatus according to claim 1, wherein the key scheduling part is configured to perform bit selection of constituent data of the round intermediate keys generated by repeating the $x^s$ times multiplication, and is configured to further perform an exclusive-OR operation between the bit-selected data and constants different for the round keys to be provided for the encryption processing part to generate round keys.

7. The encryption processing apparatus according to claim 1, wherein the key scheduling part is configured to perform non-linear transformation on constituent data of the secret key to generate the intermediate key by transformation of the secret key.

8. An encryption processing method for common-key blockcipher processing in an encryption processing apparatus, the encryption processing method comprising the steps of:
   in a key scheduling part, generating a plurality of round keys used to execute round functions for a plurality of rounds in an encryption processing part; and
   in the encryption processing part, performing data transformation in which the round functions are repeated in the plurality of rounds using the round keys,
   wherein the step of generating a plurality of round keys includes:
      generating an m-bit first intermediate key by transformation of a secret key,
      generating a plurality of different second intermediate keys by repeatedly applying an $x^s$ times multiplication over an extension field $GF(2^m)$, generated by an m-th order irreducible polynomial $f(x)$ defined over $GF(2)$, to said first intermediate key, and performing bit selection from the second intermediate keys to generate a plurality of round keys.

9. The encryption processing method according to claim 8, wherein the step of generating a plurality of round keys includes repeatedly applying an $x^s$ times multiplication over an extension field $GF(2^m)$, generated by an m-th order irreducible polynomial $f(x)$ defined over $GF(2)$, to m-bit intermediate key MK generated by transformation of the secret key to generate q round intermediate keys $\{MK_1, MK_2, \ldots, MK_{q-1}, MK_q\}$ according to the following expressions:

$$MK_1 = MK$$

$$MK_2 = MKx^s$$

$$MK_3 = MKx^{2 \times s}$$

$$\ldots$$

$$MK_{q-1} = MKx^{(q-2) \times s}$$

$$MK_q = MKx^{(q-1) \times s}.$$

10. The encryption processing method according to claim 8, wherein in the key scheduling part, the step of generating a plurality of round keys further includes repeating the $x^s$ times multiplication to generate q different round intermediate keys, and then applying an $x^{-(q-1) \times s}$ times multiplication to round-intermediate-key data generated by the (q−1)-th last $x^s$ times multiplication, given by $MK_q = MKx^{(q-1) \times s}$, to return to an original intermediate key MK that has not been subjected to the $x^s$ times multiplication.

11. The encryption processing method according to claim 8, wherein the step of generating a plurality of round keys includes performing bit selection of constituent data of the round intermediate keys generated by repeating the $x^s$ times multiplication to generate keys including round keys used to execute the round functions in the encryption processing part, an initial key used for initial data transformation before the round functions are executed, and a final key used for final data transformation after the round functions are executed.

12. The encryption processing method according to claim 8, wherein the step of generating a plurality of round keys includes performing an exclusive-OR operation between bit-selected data extracted in the performing bit selection and constants different for the round keys to be provided for the encryption processing part to generate round keys.

13. The encryption processing method according to claim 8, wherein in the step of generating a plurality of round keys, the transformation of a secret key is performed by performing non-linear transformation on constituent data of the secret key.

14. A non-transitory computer-readable storage medium including computer executable program instructions that, when accessed by an encryption processing apparatus, causes the encryption processing apparatus to perform a method for common-key blockcipher processing, the method comprising the steps of:

in a key scheduling part, generating a plurality of round keys used to execute round functions for a plurality of rounds in an encryption processing part; and in the encryption processing part, performing data transformation in which the round functions are repeated in the plurality of rounds using the round keys, wherein the step of generating a plurality of round keys includes:

generating an m-bit first intermediate key by transformation of a secret key, generating a plurality of different second intermediate keys by repeatedly applying an $x^s$ times multiplication over an extension field $GF(2^m)$, generated by an m-th order irreducible polynomial $f(x)$ defined over $GF(2)$, to said first intermediate key, and performing bit selection from the second intermediate keys to generate a plurality of round keys.

* * * * *